United States Patent [19]

Lapidus et al.

[11] Patent Number: 4,581,762
[45] Date of Patent: Apr. 8, 1986

[54] VISION INSPECTION SYSTEM

[75] Inventors: Stanley N. Lapidus, Bedford; Joseph J. Dziezanowski, Weare; Seymour A. Friedel, Goffstown; Michael P. Greenberg, Manchester, all of N.H.

[73] Assignee: Itran Corporation, Manchester, N.H.

[21] Appl. No.: 572,570

[22] Filed: Jan. 19, 1984

[51] Int. Cl.$^4$ .............................................. G06K 9/46
[52] U.S. Cl. ..................................... 382/22; 358/107; 364/559; 382/8; 382/23; 382/30
[58] Field of Search .................. 382/22, 30, 41, 42, 382/34, 26, 48, 23, 8; 358/107; 356/394, 398; 364/518, 559

[56] References Cited

U.S. PATENT DOCUMENTS

| | | | |
|---|---|---|---|
| 3,636,513 | 1/1972 | Tisdale | 382/26 |
| 3,638,188 | 1/1972 | Pincoffs et al. | 382/26 |
| 3,748,644 | 7/1973 | Tisdale | 382/34 |
| 4,131,879 | 12/1978 | Ehrat | 382/48 |
| 4,433,438 | 2/1984 | Couturier | 382/22 |

Primary Examiner—Leo H. Boudreau
Assistant Examiner—Joseph Mancuso

[57] ABSTRACT

A vision inspection system operable with foreground illumination provides user identification of selected regions of a known object for later comparison to an unknown object. A gray scale pixel array of each selected region is processed for edges and this processed data array is stored as a template for each region. Gray scale illumination data from larger corresponding areas of the unknown object are processed for edges to form gradient maps. The first template is iteratively compared to the first gradient map. A correlation value greater than a threshold value causes the system to examine the second and possibly third gradient maps on the unknown object. Distance and angular relationships of the regions are used to both identify and orient the object under test. Once the unknown object is identified and its orientation determined, various visual attributes and measurements of the object can be determined through use of visual tools.

13 Claims, 18 Drawing Figures

Microfiche Appendix Included
(65 Microfiche, 2 Pages)

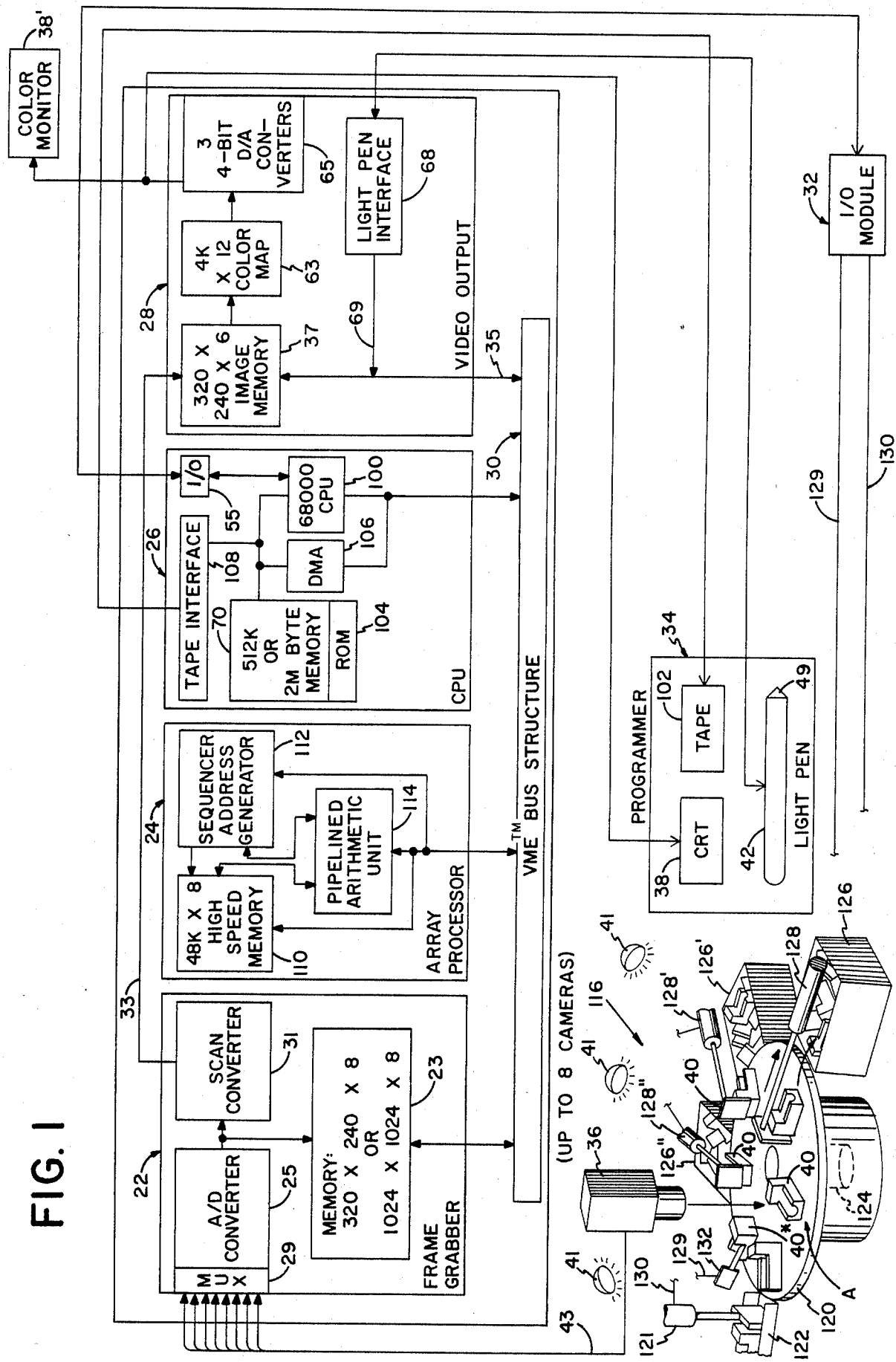

FIG. 7A
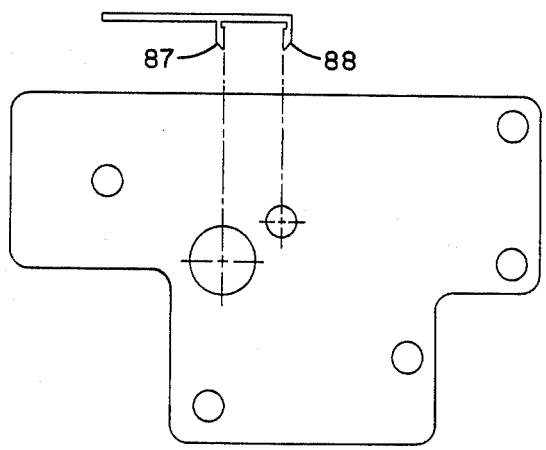
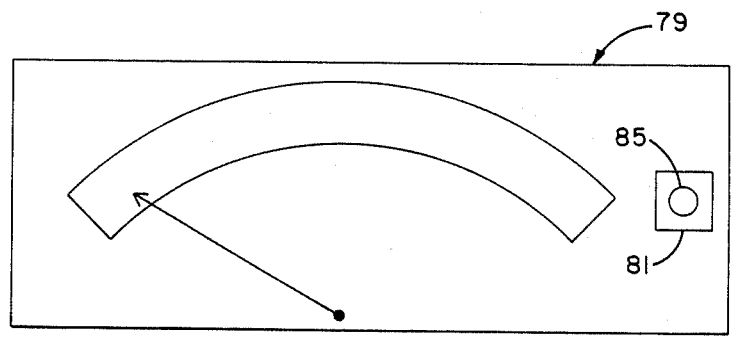
FIG. 2A

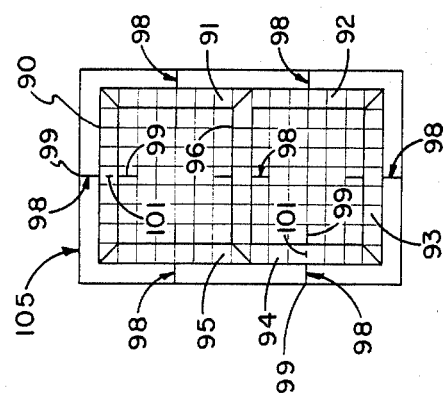

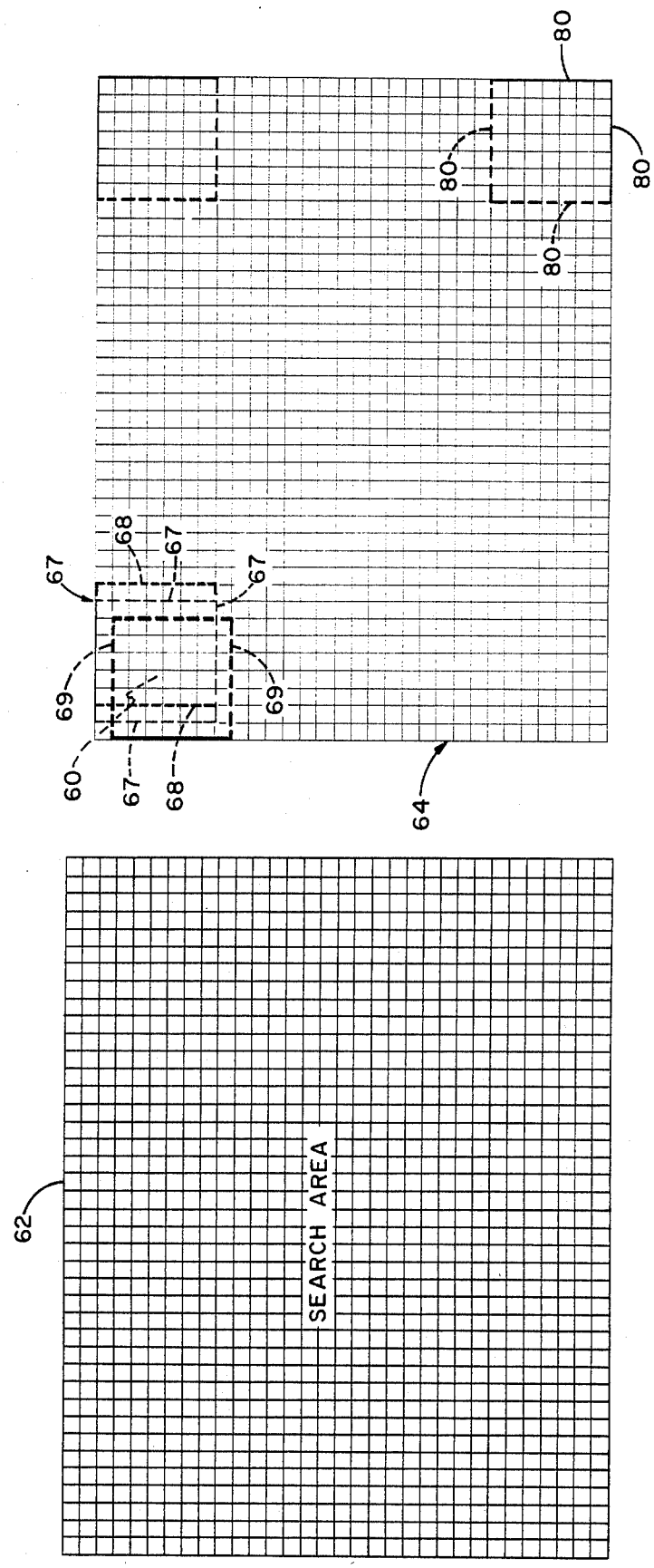

FIG. 6D

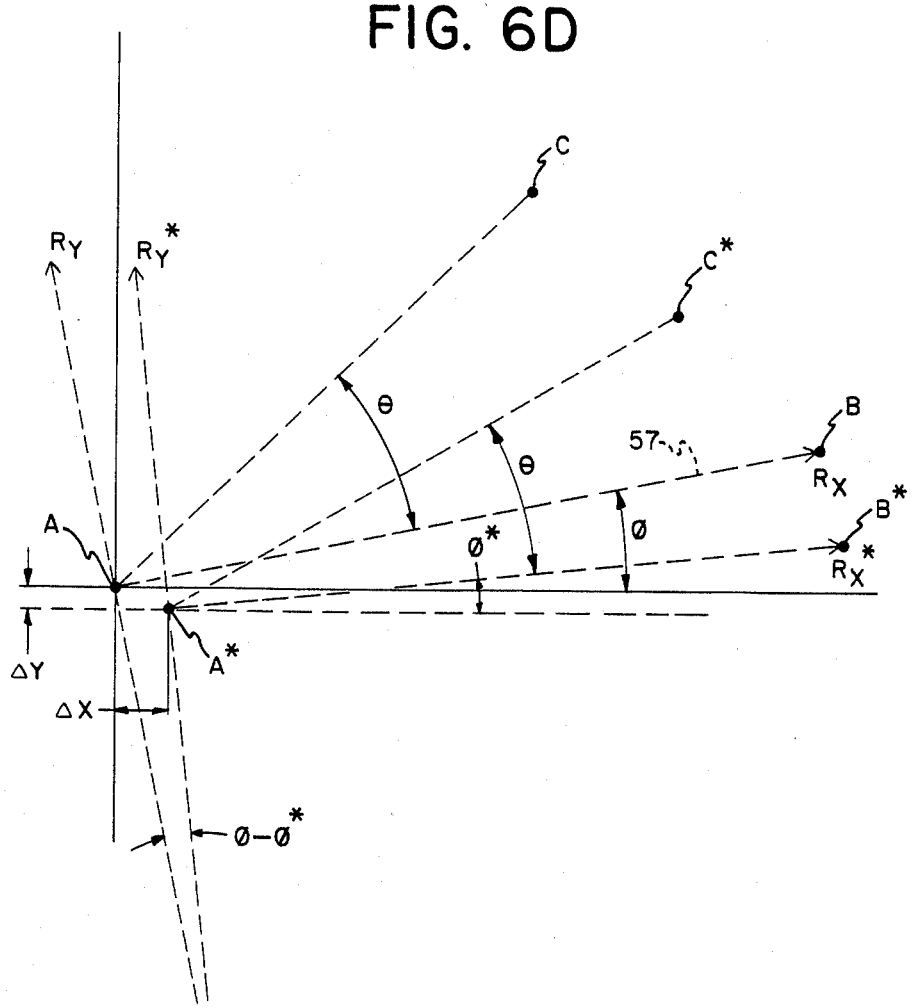

NOTE: POINT A IS THE ORIGIN OF REFERENCE FRAME R FOR THE KNOWN OBJECT

POINT $A^*$ IS THE ORIGIN OF REFERENCE FRAME $R^*$ FOR THE RECOGNIZED TEST OBJECT

A,B,C,—KNOWN OBJECT SELECTED POINTS $R_X, R_Y$—REFERENCE FRAME OF KNOWN OBJECT TO CAMERA REFERENCE $\emptyset$—ANGLE BETWEEN KNOWN OBJECT REFERENCE FRAME AND CAMERA REFERENCE $A^*, B^*, C^*$—RECOGNIZED OBJECT POINTS $R_X^*, R_Y^*$—RECOGNIZED OBJECT REFERENCE FRAME $\emptyset^*$—ANGLE BETWEEN RECOGNIZED OBJECT REFERENCE FRAME AND CAMERA REFERENCE $\emptyset - \emptyset^*$—ANGULAR DIFFERENCE BETWEEN REFERENCE FRAMES R AND $R^*$ $\Delta X, \Delta Y$—DISPLACEMENT DIFFERENCE BETWEEN REFERENCE FRAMES R AND $R^*$ $\Theta$—ANGLE SUBTENDED BY LINE SEGMENTS A-B AND A-C OR $A^*-B^*$ AND $A^*-C^*$

EDGE ENHANCEMENT FLOW

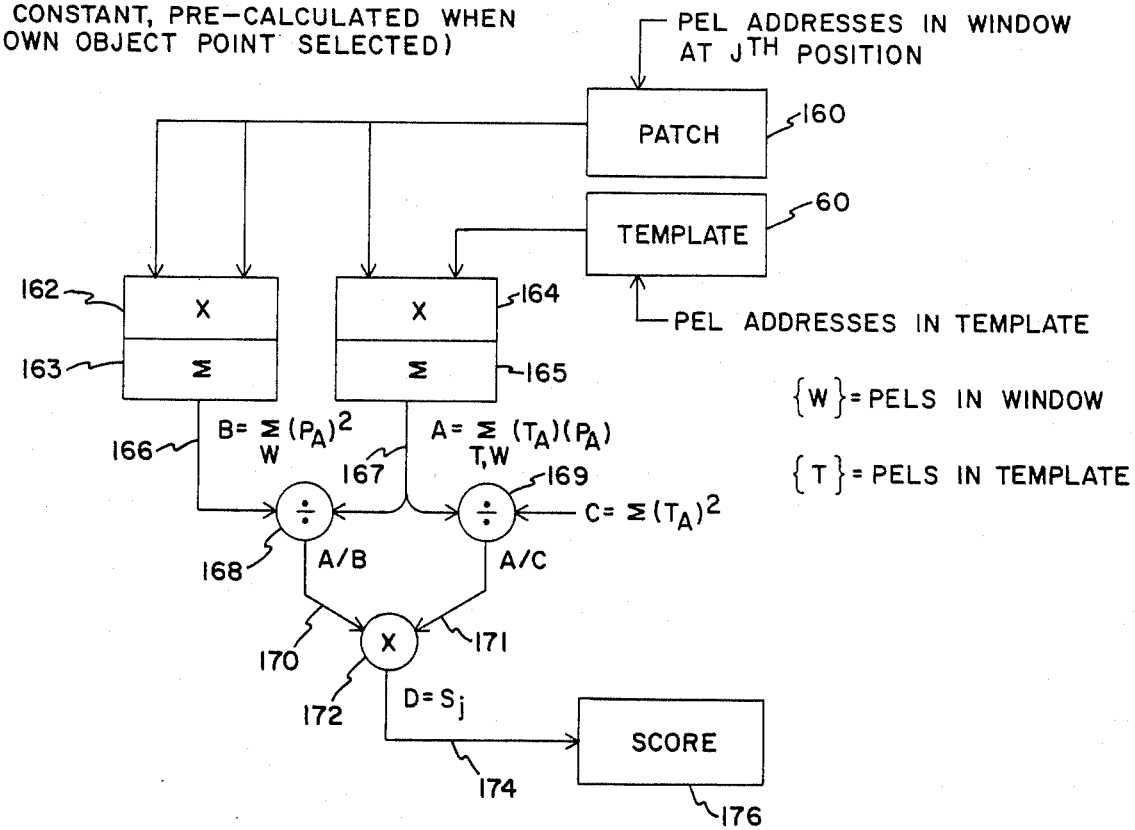

FIG. 9D — DERIVED WHEN KNOWN OBJECT POINT SELECTED; TEMPLATE 60, PEL @ $T_A$

FIG. 9E — TRIAL POSITION J, WINDOW (TEMPLATE 60), PATCH (GRADIENT MAP), PEL @ $P_A$ (FROM THE CURRENT SCENE), SCORE @ $S_A$

FIG. 9C — SCORE, COMPLETED BY ARRAY PROCESSOR $$S(j) = \frac{\left[\overbrace{\underset{T,W}{\Sigma}(T_A)(P_A)}^{\text{CROSS TERM}}\right]^2}{\underbrace{\left[\underset{T}{\Sigma}(T_A)^2\right]}_{\text{AUTOTEMP}} * \underbrace{\left[\underset{W}{\Sigma}(P_A)^2\right]}_{\text{AUTOPATCH}}}$$

(A CONSTANT, PRE-CALCULATED WHEN KNOWN OBJECT POINT SELECTED)

$\{W\}$ = PELS IN WINDOW
$\{T\}$ = PELS IN TEMPLATE

CORRELATION PROCESSING FLOW

FIG. 9B

VISION INSPECTION SYSTEM

TECHNICAL FIELD

The present invention relates to a vision inspection apparatus and in particular such apparatus which can automatically determine the similarity and orientation between a known object and an object under test and can also perform various visual tests on the unknown object once it has been identified and its orientation determined.

BACKGROUND ART

A number of prior art devices have been developed to visually inspect objects so as to determine if they meet predefined criteria. Two basic types of vision inspection systems have been developed: those which use backlighting to silhouette the object and those which use frontlighting to observe the object as a variation of illumination across its surface area. The latter type of lighting produces an image, in black and white, known in the art as a gray scale since the observed image can vary in illumination throughout all shades of gray, including zero albedo (black) and 100 percent albedo (total reflectance).

Background illuminated vision systems provide for rather easy edge detection due to the rapid transition between illuminated regions outside of the object and non-illuminated silhouette regions obstructed by the object. When the edges are not so clearly distinguished, such as when an object is frontlighted, different techniques have been used on the gray scale image to develop an edge map. Such a map actually consists of a two-dimensional binary representation of the illumination level of the object. As set forth in a book entitled *Basic Robotics Concepts* by John M. Holland, Howard W. Sams and Company, 4300 W. 62nd Street, Indianapolis, Ind., pages 192-224, most methods for determining edges that use a gray scale image determine an edge map through use of a derivative and/or second derivative of the gray scale values in two dimensions. The use of differentiation to detect edges poses a noise problem since derivative signals are inherently susceptible to large transient values. As noted in the Holland text, E. C. Hildreth and D. Marr of the Massachusetts Institute of Technology have discovered that if the images are first smoothed through filtering at different spatial bandwidths, the resultant images when subjected to differential edge detection produce edge maps which can be correlated to find the edges of the real objects (see Hildreth, Helen C., *Implementation of a Theory of Edge Detection*, M.I.T. TR-579 and Marr, D. *Vision*, W. H. Freeman Company, San Francisco, Calif., 1981).

Another form of edge detection is known as the Sobel technique as described at page 337 of a book entitled *Digital Image Processing* by Gonzales and Wintz, published by Addison Wesley Company, 1977. For a 3×3 image defined by rows a, b, c,
d, e, f,
g, h, i, and the gradient at midpoint e is defined as $$G=(G_x^2+G_y^2)^{\frac{1}{2}},\qquad (EQ\ 1\text{-}1)$$

or using absolute values $$G=|G_x|+|G_y|;\qquad (EQ\ 1\text{-}2)$$

where $$G_x=(c+2f+i)-(a+2d+g)\qquad (EQ\ 1\text{-}3)$$

and $$G_y=(a+2b+c)-(g+2h+i)\qquad (EQ\ 1\text{-}4)$$

This technique for edge detection is used by the present invention. It has also been used by the General Motors Corporation in a vision inspection system called SIGHT-I, described in an article entitled "General Motors Inspects IC Chips" appearing in the May 1980 issue of *Computer* magazine, published by the Institute of Electrical and Electronics Engineers, Inc. (IEEE) Computer Society, Los Almitos, Calif. In the SIGHT-I system, the gradient information is only used to determine approximate rotation of an object under test and is not used as a general technique to compare two objects.

The SIGHT-I system also describes a technique for recognizing an object which is under test, in this particular case a small integrated circuit (IC) chip which has been bonded to a heat sink.

After the approximate orientation of the object is determined, the corners of the object are determined by the difference in illumination to be expected at corners; that is, the differences in illumination between darkness and lightness. Thus, for instance, the northwest corner of the chip should have white areas at its top and left sides. Four local illumination intensity templates are used to identify the characteristics of the four types of corners and are matched against each illumination pixel of the array using a weighting algorithm.

The actual corners are determined by the fixed relationship of the ob3ect since its actual shape is known. In the example with the integrated circuit chip, it is known that the corners comprise four 90° angles, that the chip has specified dimensions and an approximate orientation angle. These characteristics are combined into a global template which is matched against sets of possible corners. An algorithm then calculates a "goodness of fit" figure for each set and selects the best fitting set as the actual corners.

Thus although gradient information is used to determine a probable orientation of the IC chip, illumination information is used to compare the corners of a known IC chip to potential corners of an IC chip under test. No gradient information is used to generate the corner templates nor to derive information about selected regions on the IC chip under test.

The present invention is distinguished from the GM technique since the present invention compares a known object to a test object by use of gradient information, not illumination information. By so doing, the system becomes immune to changes in ambient light or other paramenters that can affect absolute illumination values. The GM technique is not immune to such changes.

Furthermore, in the present invention, orientation of the object under test is determined by finding the angular and displacement differences between the selected points on the known object and the recognized points on the object under test. Overall gradient information of the object under test is not used, as in the GM system, to determine probable angular movement of the IC chip under test. Therefore the use of gradient information in the GM system is for a different purpose than its use in the present invention.

The present invention also provides means for using various visual tools for measuring or determining the presence of specified parameters or features on the object under test. Such parameters and features include a visual tool to measure the size of an object in a manner similar to that performed by mechanical calipers, a tool to determine an alphanumeric or other symbol displayed on an object through use of character segement recognition, a tool to locate the center of a hole within an object, a tool to measure the angle subtended by three points on an object, a tool to count the number of edges in a specified region as compared to a known object, and other tools which may be required for identification or measurement of an object typically in an industrial assembly or testing environment.

Therefore it is submitted that the present invention provides a new vision inspection system based upon the property of edges which allows for the rapid identification and orientation of an object under test as compared to a known object. By allowing the user to define the edge locations of an object for comparison to unknown objects, the system provides the flexiblility to meet the requirements of the user without being constrained by particular characteristics of the objects under test. Also, since only areas about selected locations are used in the recognition process, other areas of the object under test can vary without affecting this process. This feature of the present invention is valuable in inspection applications where only certain features of the object under test need correspond to a known object. Indeed such objects may not be subject to testing using other vision inspection techniques.

The present invention thus differs from other pattern recognition techniques including template matching in which the entire image of an object is stored in memory for comparison to images seen by the camera (see pages 205-207 of *Basic Robotics Concepts,* cited above). It also differs from techniques which are tolerant to orientation variations between a known object and an object under test such as those that use area, moments, and axes of minimum inertia as described in *Basic Robotics Concepts,* above, at pages 205-212, or through use of a technique known as moment invariants as described in *Basic Robotics Concepts* at pages 212-213 and the appendices thereto.

In distinction from pattern recognition techniques that use moments or moment invariants to determine a correspondence between two objects, the present invention uses points selected by the user to define those areas on a known object which characteristically represent that object. Such points are visually perceptible to the user, unlike the highly abstract nature of moments and moment invariants which have not direct visual representation.

Furthermore, by allowing points to be selected by the user on the known object, other portions of the object which may change in size or shape, can be ignored for purposes of recognition testing.

Indeed, the present invention need not know any particular information concerning the overall shape of an object provided that the object of interest can be defined by distinct edges. In many testing applications of component parts, this is all that need be performed in order to find and determine the orientation of an object under test. In most applications, however, the visual tools of the present invention are used once the object is identified and oriented. These tools provide valuable information required to perform automatic inspection. Such visual tools are a unique feature of the present invention and allow it to easily adapt to the particular needs of the user.

These visual tools and positioning locations provide a working environment that is familiar to people who traditionally use mechanical devices to measure and test objects. Thus the three positioning locations typically selected on the known object correspond to mechanical positioning pins used to orient an item to be tested. The visual tools of the present invention likewise correspond to such measuring instruments, such as calipers, used to mechanically measure objects.

It is submitted that the present invention provides a new technique and system for performing visual inspection of objects.

DISCLOSURE OF THE INVENTION

An automated vision inspection system is disclosed which allows the user to select points of a known object so as to be able to identify and orient objects under test. Once a test object is recognized and oriented with respect to the known object, desired visual measurements are automatically performed on the test object. The results of these measurements provide the means for making logical decisions regarding the ultimate disposition of the test object. The automated vision inspection system is therefore able to perform the tasks of a human inspector in a highly reliable and efficient manner.

In operation, the user first views a known object as displayed on a screen imaged by one or more video cameras. The image is stored in a frame grabber module which stores the image as pixels with six bits of illumination data. The user selects, via a light pen, three points on the imaged known object which preferably represent an abrupt surface illumination variation (i.e. rapid albedo variation) of the object. Such abrupt surface variations are generally referred to as "edges" throughout this text, and in many instances actually represent physical edges. The three selected points are used by the system in a manner analogous to positioning pins used in mechanical alignment systems. The selected points are typically located about or near the outer periphery of the known object. Such locations of rapid albedo variations are generally selected to represent a characteristic feature (i.e., edge) of the object that is independent of illumination position.

The selection of each location by the user then causes the system to store a $9 \times 9$ pixel region about the selected location. Based upon the illumination values of the respective pixels, the system computes the illumination gradient at each pixel within a $7 \times 7$ region enclosed by the $9 \times 9$ pixel region. The gradient value for each pixel within the $7 \times 7$ region represents the differential change in illumination in both Cartesian directions. This gradient information is stored and used as a template by the system since it more accurately represents the visual characteristics of the location selected by the user. The actual center point selected by the user is defined as the centroid of the template and is used to compute distances between it and two other points selected by the user. In addition, the angle subtended between the first point (centroid) and second and third points (centroids) is determined for later use in examining unknown objects. This angle in combination with the two lengths defines the vertices of the three points, which by definition, define a triangle.

Thus, once three points of a known object have been selected and their corresponding edge or gradient values determined, this information forms the basis to determine whether an unknown object corresponds to the known object.

In a typical manufacturing or inspection process, the unknown object (object under test) is viewed in an orientation substantially the same as that of the known object. This characteristic of the testing process allows the present invention's vision system to look at an enlarged pixel area typically comprising a 10% area of the unknown object as viewed by the particular imaging camera which overlaps the coordinates of the known object's computed point. This can be visualized as a rectangle having larger dimensions than the known object selected area (template). A gradient map of this larger rectangle is computed. The template of the known object is then placed over a portion of this gradient map in a manner conceptually similar to a window through which one looks at a portion of the gradient map. Once this has been done by the system, a correlation operation is performed between the template and the corresponding portion of the gradient map overlaid by the template. This process is repeated over the entire gradient map by moving the template across the larger gradient map one pixel at a time.

The greater the similarity between the template and the overlaid portion of the gradient map, the higher the correlation value. In order to normalize the computed correlation values, the square of each correlation value is divided by the auto-correlation of the template (called the Autotemp) times the auto-correlation of the overlaid gradient map (called the Autopatch, where "patch" is the patch of the gradient map overlaid by the template or "window").

If the correlation value computed is found to exceed some predetermined fractional amount of 100% correlation, then the system proceeds to determine if the distance from the center of this area equals the distance between the first and second centroids of the known object. In order to determine the direction of this line length, the first known object's second point is used as the center of an arc through which the system scans the unknown object, applying the same correlation test with the second point's template as that used for the first location. Typically this is done over a plus or minus five degree arc from the nominal position or the second point corresponding to the orientation of the second point on the known object. If a correlation for each template movement over this arc does not produce a correlation value greater than the predetermined amount, the system goes back to the first location, increments the movement of the template over the first gradient map, computes the correlation value with the first template, and continues this process until a site is found over the first gradient map which exceeds the predetermined threshold value. If such a site is located, another plus or minus five degree arc having a length equal to that between the first and second known points is used to test the second location with the second template in a manner described above.

When the second location correlation value exceeds the threshold value, two points have in essence been found on the unknown object which correspond to the known object by at least the threshold value. Since these two points are known and since the angle and distance of the third location on the known object is known with respect to the first and second points on the known object, a region on the unknown object corresponding to this second distance and angular relationship is defined. The correlation value at this region is determined with respect to the gradient values of the known object's third location template. If the correlation value exceeds the threshold value, then a composite value representing the correlation of all three determined points is computed and saved by the system. This composite value in essence represents a measure of the degree of confidence that the regions about these three points correspond to those on the known object.

In order to ensure that these three locations have the highest probability of actually corresponding to the three locations on the known object (that is, they best meet the spatial criteria of the known object), the template for the second location is incremented along the arc to determine if another location exceeds the threshold value. For each such location found, a candidate third location for the third gradient map is determined to see if it exceeds the threshold value. This process is continued for all locations along the arc in the second gradient map.

If three locations for the three gradient maps exceed the threshold value, then their composite correlation value is determined, and if greater than the previous composite value, it replaces that value along with the previous three points.

To further ensure that the three locations have the highest probability of actually corresponding to the three locations on the known object, the first template continues to be incremented over the unknown object's first location gradient map with correlation values computed. Whenever a correlation value exceeds the threshold value, the above steps are repeated. If three qualifying points are determined, a composite correlation value is computed, and if it exceeds the previously determined composite value, the latter composite value and the corresponding points are stored by the system to the exclusion of the previously computed values. The latter values in essence represent three locations on the unknown object which match those of the known object with a higher confidence factor.

This process is continued throughout the entire first gradient map. The three locations yielding the highest composite correlation value not only establish recognition of the object under test to the known object, but also establish the recognized object's orientation with respect to the known object by the angular displacement and translation of these locations from their nominal locations as viewed by the system for the known object.

In actuality the three points on the identified object provide the system with the mechanical analogy of three positioning pins which then provide the means for performing any one of a plurality of visual measurement tests (called visual tools) which the user may desire to be performed on the identified object. These tools include a visual caliper to measure the distance between two regions on the object, in a manner analogous to a mechanical caliper; a bar code reader to read a bar code on the object; a multi-segment reader to read an alphanumeric font on the object; and an area counter (also called a defect finder) to determine the number or edges (rapid albedo variations) in a defined rectangular area and to compare this number to a corresponding number for the known object. Other visual tools can be defined and implemented, including angle finders and hole center finders.

It will thus be appreciated that this vision inspection system provides the means to select characteristic points on a known object and thereby provides a more adaptable way to identify a known object. This in turn provides the means for more easily identifying and orienting an object under test in comparison to the known object.

Through use of gradient information regarding the illumination values or selected locations of both the known and unknown objects, immutable edge information is used by the system rather than the less reliable overall illumination values associated with the known and unknown objects. Under typical conditions the illumination values can readily vary due to parameters unrelated to the characteristic of the object under test, such as changes in illumination levels, changes in the positions of lights with respect to the objects, and shadows which are formed on the object under test due to outside disturbances. The present invention thereby uses gray scale information to determine gradient inrormation which represents the physical properties of the objects under test so as to facilitate comparisons of one object to another. Through use of gray scale illumination—typically in a range from 0 to 63 in overall magnitude—great variations in illumination values can be tolerated by the system while still providing reliable testing of one object vis-a-vis another object. In addition, through use of gray scale observation of an object, foreground illumination as distinguished from background illumination is used, thereby greatly reducing problems associated with test apparatus which require background silhouette illumination. These problems include the need for conveyor or other support apparatus to allow light to pass therethrough and problems due to changes in background illumination as a result of dirt or other environmental hazards.

The visual tools of the system provide the means to measure and inspect the identified objects for features or characteristics of interest. With this measurement and inspection information, the system is able to take appropriate action via an input/output module as to the disposition of the identified object.

Thus a vision inspection system is described which finds, identifies, measures, and inspects an object and takes appropriate action in response thereto in a manner analogous to a human inspector.

OBJECTS OF THE INVENTION

Therefore it is a principal object of the present invention to provide a vision inspection system that can emulate the decision-making processes and actions performable by a human inspector.

Another object of the present invention is to provide a vision inspection system of the above character that identifies a known object by the selection of three points on the known object and the determination of illumination gradient information corresponding to templates associated with each point, and using these templates and the geometric interrelationship of these points to determine if an object under test corresponds to the known object.

A further object of the present invention is to provide a vision inspection system of the above character that performs visual measurements of identified objects.

Another object of the present invention is to provide a vision inspection system of the above character in which visual measurements include visual tools that emulate mechanical measuring devices, including calipers and defect finders.

A still further object of the present invention is to provide a vision inspection system of the above character that includes a multi-segment character reader so as to read alphanumeric displays.

Another object of the present invention is to provide a vision inspection system of the above character that includes an input/output (I/O) module that controls the disposition of the object under test based upon the results of the inspection and visual tool tests.

A still further object of the present invention is to provide a visual inspection system of the above character in which the user instructs the system as to the desired test procedures through use of a light pen associated with a CRT monitor.

Another object of the present invention is to provide a visual inspection system of the above character having a tape driver for storing user test procedures and/or data on magnetic tape.

A further object of the present invention is to provide a visual inspection system of the above character which includes up to eight cameras to view various portions of a single object under test, or a plurality of objects under test.

Another object of the present invention is to provide a visual inspection system of the above character which uses an array processor to execute the majority of the mathematical computations necessary to inspect objects on a timely basis.

Other objects of the present invention will in part be obvious and will in part appear hereinafter.

BRIEF DESCRIPTION OF THE DRAWINGS

For a better understanding of the nature and objects of the present invention, reference should be made to the following detailed description taken in connection with the following drawings in which:

FIG. 1 is an overall block diagram of the vision inspection system showing its interaction with a workstation where parts are visually inspected and sorted based upon the results of the inspection process;

FIG. 2A is a diagrammatic representation of a part having a light for which average intensity illumination is to be tested;

FIG. 3 is an enlarged diagrammatic representation of the 9×9 illumination intensity pixel array which surrounds a point selected by the user;

FIG. 4 is an enlarged diagrammatic view of the 7×7 template formed from the gradient computations made on the 9×9 pixel array shown in FIG. 3;

FIG. 5 is a diagrammatic representation of the nine illumination values whose center element is located at row 2, column 5 of the pixel array shown in FIG. 3; wherein these nine values are used in the process of determining one gradient value;

FIG. 6A is a diagrammatic representation of a search area of illumination pixel values on the unknown object used to evaluate a gradient map;

FIG. 6B is a diagrammatic representation of one of the unknown object's gradient maps derived from the illumination search area shown in FIG. 6A showing, in phantom, the movement of the template over the gradient map in the process of determining correlation values between the template and portions of the gradient map overlaid by the template.

FIG. 6D is a Cartesian diagram of the reference frames associated with the known and recognized objects.

FIG. 7A is a portion of a CRT screen that has imaged a part in which the user is manipulating the caliper tool to measure the distance between the center points of two holes;

FIG. 8 is a view of a character imaged on a CRT screen and the use of the seven-segment visual tool;

FIG. 9B is a detailed block diagram of the operations performed by the array processor so as to compute the correlation values between a template and a portion of a gradient map.

FIG. 9C shows the computed correlation values as a template moves across a gradient map.

FIG. 9D is a hypothetical representation of a template showing in phantom what the template values represent; and FIG. 9E is a hypothetical representation of a gradient map showing in phantom what the gradient map values represent.

BEST MODE FOR CARRYING OUT THE INVENTION

Figure 7:
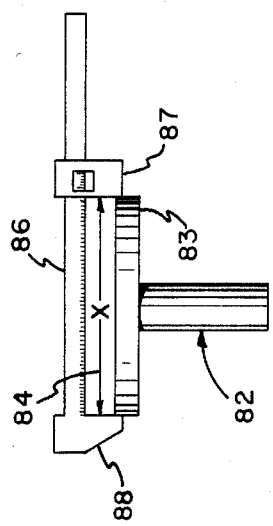
FIG. 7 is a view of a portion of a CRT screen that has imaged a part, and also shown the user manipulating the caliper visual tool thereon.

As best seen in FIG. 1, vision inspection system 20 according to the present invention comprises a number of modules which interact to produce the desired result of defining, in terms of position points and visual tests (tools), a known object to form the basis for testing other (unknown or test) objects, including inspecting unknown objects to determine if they correspond to the known object, and if they do correspond (i.e., are recognized), performing the selected visual tests to those recognized objects. The system also presents output information regarding the test results of each tested object for use by external devices including controlling the disposition of the tested object.

As seen in FIG. 1, the basic blocks of the system are a frame grabber module 22, an array processor 24, a central processor unit (CPU) 26, a video output module 28, a bus 30, an I/O module 32, a programmer module 34, and a plurality of cameras 36. These modules and components are discussed in a separate section below.

Operation of the Visual Inspection System

The programmer module 34 provides the user with the necessary tools to instruct and use the overall visual inspection system 20. In this regard the module 34 comprises a cathode ray tube (CRT) 38 which displays the image 40' of part 40 as viewed by cameras 36. Part 40 corresponds to either the known object to form the basis for visual tests, or an unknown test object, to be tested for recognition, and if recognized as corresponding to the known object, visually tested with one or more visual tools. Depending upon the particular application and need for resolution, one or more cameras may be used to view part 40, up to a maximum of eight cameras. If multiple cameras are used, each camera views a different portion of the part. A light pen 42 (shown in exaggerated form in FIG. 1) is physically manipulated by the user and positioned on CRT screen 38 so as to pick out various points on the CRT image 40' of part 40 which correspond to points which are of particular interest to the user. These points are typically where an edge is located. They can also be places where the user wishes some visual test to be performed on an object. The light pen is also used to select various options displayed on CRT screen 38 which are available during the setup and operation of a test procedure.

Figure 2:
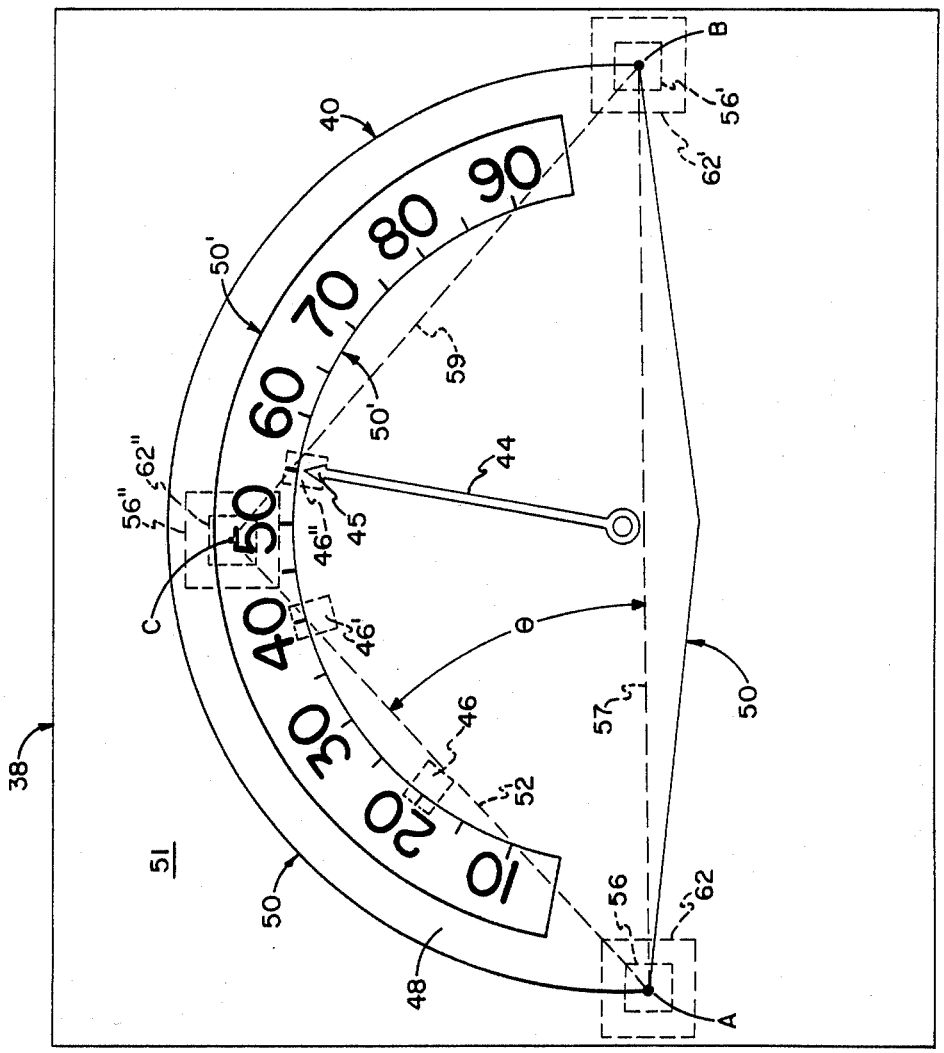
FIG. 2 is a view of the cathode ray tube (CRT) screen showing an imaged part thereon and three points which a user has selected via the light pen shown in FIG. 1. It also shows, in phantom, the 9×9 pixel arrays about the selected points, search areas associated with and used in the recognition of unknown objects, and selected areas where area counter visual tests are to be performed on recognized objects.

To better understand the operation of the present invention, an example of a typical visual inspection process is presented. FIG. 2 shows one such typical application in which the visual inspection system is used to determine if a motor vehicle speedometer 47 is properly calibrated. Typical automobile production speedometers must have a predefined accuracy at various speeds. For example the speedometer pointer 44 must be within area 46, 46' or 46" (shown in phantom in FIG. 2) when the speedometer cable (not shown) is turned at a rate corresponding to a speed 20 miles per hour (mph), 40 mph and 55 mph, respectively. Thus, if the pointer is not found within area 46" when the test rig is operating at a speed corresponding to 55 miles per hour, the speedometer is rejected and sent for recalibration or other corrective action.

When this test procedure is set up, the first operation is for the inspection system to identify the shape and orientation of a known speedometer to which the other speedometers will be tested. As shown in FIG. 2, this known speedometer has a characteristic shape with indicia on it. The speedometer also has a surface 48 which, when illuminated by light sources 41, produces a reflected image as viewed by camera(s) 36 and imaged on CRT 38 as object 40'. This imaged part 40' will typically have rapid gradations in its brightness corresponding to areas on the surface with changes in contour, including projections or depressions on the surface (including holes). The edges of the speedometer as viewed against the background 51 upon which it is placed also produces rapid illumination variations. Rapid illumination variation is also produced by lines on other indicia printed on the object.

It has been experimentally found that glare on the surface or the object does not produce rapid illumination variation at the pixel level (i.e., the highest resolution of the CRT image) due to the diffuseness of glare which spreads over a portion of the object. Glare therefore does not have sharply defined terminations. Similarly, shadows induced by extraneous material spaced away from the test object produces shadows with relatively large spatial penumbras which do not give rise to rapid illumination variations. This phenomenon is to be distinguished from shadows induced by surface variations of the test object (including holes), which due to their intimate proximity to the test object and their spatial separation from the light sources, produce sharply defined shadows with corresponding rapid illumination variations.

It has also been experimentally found that spatially separated areas with rapid illumination variation virtually uniquely characterize mass-produced objects and therefore can be used to identify a known object and form the basis for recognizing unknown objects. For the speedometer shown in FIG. 2, such areas include the exterior edge 50 of the speedometer, the edge of the arcuate cutout portion 50', as well as the indicia within the cutout portion 50'.

In this example of the speedometer the user simply selects three points corresponding to three regions where edges are present. These three points are preferably non co-linear points, and if possible, corners of the object that are spatially distant from one another. In the example shown in FIG. 2, points A, B and C have been selected by the user for later use in the visual inspection system.

For each point selected, the visual inspection system captures the illumination values of an area 56, 56', or 56" surrounding that given point. As shown in FIG. 3 for the example corresponding to point A, a 9×9 pixel area 56 is stored by the visual inspection system about point A. This 9×9 pixel area 56 is also shown in phantom in FIG. 2. The camera which images the area about point A, as well as all the other cameras, if any, produces illumination values which in their smallest composite size are known as pel or pixels. Each pixel in the present invention can have a digital illumination value ranging from zero (corresponding to no reflectance or brightness), to 63 (corresponding to maximum reflectance or brightness). The visual inspection system thus stores an array of whole numbers in the form of a 9×9 matrix where each number represents the illumination of the corresponding pixel imaged within area 56 about point A.

As seen for the example shown in FIG. 3, the illumination values tend to have a rapid change in their values in the neighborhood of point A which would correspond, in this instance, to a surface discontinuity as a result of an edge on the object in the vicinity of point A. However, the illumination values can have, for any given area, an undesirable property of varying in their overall or average value from one object to another. Thus, if an object under test is placed in the same location as the known object shown in FIG. 1, the individual pixel illumination values, though changing in magnitude with respect to each other in a manner analogous to that shown in FIG. 3 for the known object, may have overall average magnitudes greater or less than those for the known object.

For example, if the known object's pixel values in one area are, for instance:

$$\begin{array}{ccc} 4 & 8 & 2 \\ 6 & 7 & 10 \\ 22 & 18 & 20, \end{array}$$

the values for an identical area of the same object (or another object with identical albedo characteristics) could be:

$$\begin{array}{ccc} 10 & 14 & 8 \\ 12 & 13 & 16 \\ 28 & 24 & 26, \end{array}$$

if the light sources are slighty brighter when the second values are obtained. The difference in adjacent pixel values is the same in both cases, but the overall average magnitude in the second case is greater than the first one.

Such changes in overall illumination values can also be caused by extraneous light, changes in the line voltage for the lights, or slight coloration variation of the object under test compared to the known object. In any event, the use of illumination magnitude values as distinguished from magnitude differences (gradient values) is difficult in a visual inspection system.

Therefore, the present invention uses a gradient value based upon a 3×3 pixel area about each point for which the gradient value is to be computed. This can best be seen in FIG. 5 which shows the nine illumination values whose center element is at the second row and fifth column FIG. 3. By use of a technique known as the Sobel process, described at page 337 of a book entitled *Digital Image Processing* (by Gonzales and Wintz published by Addison Wesley Company, 1977), the gradient of a midpoint of a 3×3 matrix of values is defined as follows:

If the 3×3 matrix values are denoted by, $$\begin{array}{ccc} a, & b, & c \\ d, & e, & f \\ g, & h, & i, \end{array}$$

the gradient at midpoint e is defined as $$G = (G_x^2 + G_y^2)^{\frac{1}{2}} \qquad \text{(EQ 1-1)}$$

or using absolute values by $$G = |G_x| + |G_y| \qquad \text{(EQ 1-2)}$$

where $$G_x = (c + 2f + i) - (a + 2d + g) \qquad \text{(EQ 1-3)}$$

and $$G_y = (a + 2b + c) - (g + 2h + i). \qquad \text{(EQ 1-4)}$$

Thus, in the example shown in FIG. 5, the gradient values about the midpoint, corresponding to point e above, are obtained by the following equations:

$$G_x = (63 + 2 \times 63 + 63) - (0 + 2 \times 0 + 0)$$

$$G_x = (63 + 126 + 63) - (0 + 0 + 0) = 252 - 0 = 252$$

$$G_y = (0 + 2 \times 32 + 63) - (0 + 2 \times 32 + 63)$$

$$G_y = (0 + 64 + 63) - (0 + 64 + 63) = 127 - 127 = 0$$

Then, $$G = |G_x| + |G_y| = |252| + |0| = 252 + 0 = 252$$

This gradient value is then inserted in a 7×7 gradient array as shown in FIG. 4. The value computed for the example shown in FIG. 5 is entered in the first row and fourth column of this gradient array. This process is repeated for all of the illumination values within the 9×9 array shown in FIG. 3 for which the process can be computed; that is, for all values which have neighbors on all sides. This eliminates the perimeter illumination values from having corresponding gradient values.

Thus, the 7×7 gradient array 60 shown in FIG. 4 represents the change in illumination values for all interior points of the 9×9 pixel area corresponding to selected point A. In this example, the gradient values represent a vertical edge (see FIG. 2). This 7×7 gradient array is referred to as a template since it forms the basis for determining if an unknown object has a region which corresponds to this template within some measure of probability. Other examples of illumination values and the computation of corresponding gradient arrays for both a sharp edge and a gradual sharp edge are presented in Table 1.

TABLE 1
CALCULATIONS OF SOBEL TYPE GRADIENT VALUES (A) 9 × 9 matrix of illumination values for a sharp 45 degree edge starting at lower left-hand corner (row 9, column 1); extending up to row 4, column 5, and from there forming a horizontal edge.

|  |  |  |  |  |  |  |  |  |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 5 | 5 | 5 | 5 | 5 |
| 0 | 0 | 0 | 5 | 10 | 10 | 10 | 10 | 10 |
| 0 | 0 | 0 | 10 | 10 | 10 | 10 | 10 | 10 |
| 0 | 5 | 10 | 10 | 10 | 10 | 10 | 10 | 10 |
| 5 | 10 | 10 | 10 | 10 | 10 | 10 | 10 | 10 |
| 10 | 10 | 10 | 10 | 10 | 10 | 10 | 10 | 10 |

Result of SOBEL $Grad_x$

| 0 | 0 | 0 | 0 | 0 | 0 | 0 |
|---|---|---|---|---|---|---|
| 0 | 0 | −5 | −5 | 0 | 0 | 0 |
| 0 | −5 | −20 | −15 | 0 | 0 | 0 |
| −5 | −20 | −30 | −15 | 0 | 0 | 0 |
| −20 | −30 | −20 | −5 | 0 | 0 | 0 |
| −30 | −20 | −5 | 0 | 0 | 0 | 0 |
| −20 | −5 | 0 | 0 | 0 | 0 | 0 |

Result of SOBEL $Grad_y$

| 0 | 0 | 0 | 0 | 0 | 0 | 0 |
|---|---|---|---|---|---|---|
| 0 | 0 | −5 | −15 | −20 | −20 | −20 |
| 0 | −5 | −20 | −35 | −40 | −40 | −40 |
| −5 | −20 | −30 | −25 | −20 | −20 | −20 |
| −20 | −30 | −20 | −5 | 0 | 0 | 0 |
| −30 | −20 | −5 | 0 | 0 | 0 | 0 |
| −20 | −5 | 0 | 0 | 0 | 0 | 0 |

Gradient Results

| 0 | 0 | 0 | 0 | 0 | 0 | 0 |
|---|---|---|---|---|---|---|
| 0 | 0 | 10 | 20 | 20 | 20 | 20 |
| 0 | 10 | 40 | 50 | 40 | 40 | 40 |
| 10 | 40 | 60 | 40 | 20 | 20 | 20 |
| 40 | 60 | 40 | 10 | 0 | 0 | 0 |
| 60 | 40 | 10 | 0 | 0 | 0 | 0 |
| 40 | 10 | 0 | 0 | 0 | 0 | 0 |

Result: Grad = $|Grad_x|$ + $|Grad_y|$ 7 × 7 array (B) 9 × 9 matrix of illumination values for a more gradual edge than that shown for (A) above, but having an edge outline corresponding to that in (A) above.

|  |  |  |  |  |  |  |  |  |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 5 | 5 | 5 | 5 | 5 |
| 0 | 0 | 0 | 5 | 8 | 8 | 8 | 8 | 8 |
| 0 | 0 | 5 | 8 | 10 | 10 | 10 | 10 | 10 |
| 0 | 5 | 8 | 10 | 10 | 10 | 10 | 10 | 10 |
| 5 | 8 | 10 | 10 | 10 | 10 | 10 | 10 | 10 |
| 8 | 10 | 10 | 10 | 10 | 10 | 10 | 10 | 10 |

Result of SOBEL $Grad_x$

| 0 | 0 | 0 | 0 | 0 | 0 | 0 |
|---|---|---|---|---|---|---|
| 0 | 0 | −5 | −5 | 0 | 0 | 0 |
| 0 | −5 | −18 | −13 | 0 | 0 | 0 |
| −5 | −18 | −26 | −13 | 0 | 0 | 0 |
| −18 | −26 | −20 | −7 | 0 | 0 | 0 |
| −26 | −20 | −9 | −2 | 0 | 0 | 0 |
| −20 | −9 | −2 | 0 | 0 | 0 | 0 |

Result of SOBEL $Grad_y$

| 0 | 0 | 0 | 0 | 0 | 0 | 0 |
|---|---|---|---|---|---|---|
| 0 | 0 | −5 | −15 | −20 | −20 | −20 |
| 0 | −5 | −18 | −29 | −32 | −32 | −32 |
| −5 | −18 | −26 | −23 | −20 | −20 | −20 |
| −18 | −26 | −20 | −11 | −8 | −8 | −8 |
| −26 | −20 | −9 | −2 | 0 | 0 | 0 |
| −20 | −9 | −2 | 0 | 0 | 0 | 0 |

Gradient Results

| 0 | 0 | 0 | 0 | 0 | 0 | 0 |
|---|---|---|---|---|---|---|
| 0 | 0 | 10 | 20 | 20 | 20 | 20 |
| 0 | 10 | 36 | 42 | 32 | 32 | 32 |
| 10 | 36 | 52 | 36 | 20 | 20 | 20 |
| 36 | 52 | 40 | 18 | 8 | 8 | 8 |
| 52 | 40 | 18 | 4 | 0 | 0 | 0 |
| 40 | 18 | 4 | 0 | 0 | 0 | 0 |

Result: Grad = $|Grad_x|$ + $|Grad_y|$ 7 × 7 array

Besides template 60, similar templates 60' and 60" (see FIG. 6C) are computed for the two other points selected by the user on the known object, and these three points then define a triangle comprising line segments 57, 58, and 59 shown in phantom in FIG. 2. In addition to these three templates, the visual inspection system also stores the length of line segment 57 between points A and B, the length of line segment 58 between points A and C, and the angle theta ($\theta$) between line segments 57 and 58.

The information corresponding to templates 60, 60', 60'' in combination with the length of line segments 57 and 58 and their angular interrelationship as defined by angle theta forms the basis for determining if an unknown object corresponds to the known object and secondly determines the orientation of the unknown object with respect to the known ooject as originally observed by the system. The process of determining if an unknown object corresponds to the known object is in essence a recognition test which is based upon the template and line segment angular relationship of the three points selected by the user with respect to the known object.

When the unknown object is positioned for viewing by cameras 36, a recognition test can be performed. Its image can, if desired, be projected on CRT screen 38 or color monitor 38'. The recognition test is performed by selecting a search area 62 on the unknown object in which an area corresponding to the 9×9 pixel area 56 on the known object may exist. The center of the search area corresponds to the template center of the known object. Since the unknown object is normally positioned with respect to cameras 38 and light sources 41 in a manner similar to that of the known object, the visual inspection system need not inspect the entire surface of the unknown object in order to determine if a region corresponds to a region on the known object. Within the alignment accuracy of the mechanism for viewing the unknown object 40, (e.g. turntable 120 shown in FIG. 1) the visual inspection system views an area on the unknown object with an area larger than the 9×9 pixel area (the illumination values for the original template) but whose overall size is inversely proportional to the placement accuracy of the unknown object for viewing by cameras 38.

In a typical situation, the visual inspection system analyzes a search area 62 (shown in phantom in FIG. 2) on the unknown object within which a region corresponding to region 56 for point A of the known object may reside. The size of this search area is typically 40×32 pixels, but it can be adjusted by the system operator. The gradient values for each interior pixel of this matrix is determined using the Sobel process with the numerical gradient values producing an array of pixel gradient values known as gradient map 64 as shown in FIG. 6B. Thus for a 40×32 search area, a 38×30 gradient map is produced. The computation of the gradients from the search area 62 to the search area gradient map 64 corresponds to the generation of the 7×7 template shown in FIG. 4 based upon the illumination values in the 9×9 pixel area 56 shown in FIG. 3. Similar search areas 62' and 62'' are also produced by the visual inspection system with corresponding search area gradient maps 64' and 64'' for regions centered about points B and C as those points are located on the known object in relationship to line segments 57 and 58 and angle theta. Each gradient map 64, 64' and 64'' as well as templates 60, 60' and 60'' and their angular and distance relationships are stored in the system's random access memory 70 in the CPU module 26 (see FIG. 1).

Once the gradient maps have been determined, the recognition procedure then begins a systematic search for a correspondence between a region in gradient map 64 to template 60 (corresponding to the region about point A) in the known object. As seen in FIG. 6B, the recognition test procedure begins with the placement of template 60 at the upper left-hand corner of the search area gradient map. The 7×7 template thus overlies a 7×7 portion of the search area gradient map. In order to determine how well the overlaid portion of the gradient map corresponds to the template, a normalized form of a mathematical correlation is determined by use of the following equation:

$$C(n) = (\text{Cross} * \text{Cross})/(\text{AutoPatch} * \text{AutoTemp}); \quad \text{(EQ 2-1)}$$

where Cross is defined as a number obtained by summing the results of multiplying (this summing of the products is called "convolving") each element in the 7×7 template with the overlaid element in the 7×7 portion of the gradient map, where AutoPatch is defined as convolving the 7×7 overlaid portion of the gradient map with itself, and where AutoTemp is defined as convolving the 7×7 template with itself.

As seen in this equation, the Cross term is multiplied by itself and thus if a perfect match is obtained between the template and the overlaid portion of the gradient map, the value of C(n) is one. For all other situations (that is where a perfect match is not present), the value of C(n) for a given portion of the gradient map is always less than one. Therefore, the correlation value computed gives a means for determining the degree of correspondence between the overlaid portion or the gradient map with the template.

Based upon this degree of correspondence (or goodness), the visual inspection system either accepts or rejects the value as representing a region potentially corresponding to that about point A of the known object. In the preferred embodiment of the present invention, if the normalized correlation exceeds a value of 0.85, the system accepts that portion of the gradient map as potentially corresponding to a region 56 about point A of the known object (see FIG. 1). If the value does not exceed 0.85, then the template is moved one position with respect to the gradient map as shown by the 7×7 dotted area defined by line segments 67 shown in FIG. 6B. At this time a new correlation value is computed. Thus, the letter "n" for the variable C(n) corresponds to the particular location of the template with respect to the gradient map. This can be defined as C(1) when the template is over the upper lefthand portion of the gradient map (as shown in FIG. 6B), C(2) when the template is at the location defined by line segments 67, C(3) when the template is defined by line segments 68 as shown in FIG. 6B, and so on, for 32 movements of the template across the upper portion of the gradient map. As will be explained further below, the template is then shifted down one row as shown by line segments 69 and the process repeated for 32 more locations corresponding to this row. The template can be moved down equal to the height of the gradient map (namely 30 pixels) minus the height of the template plus one. Thus if the gradient map is 30 pixels high and the template 7 pixels high, 24 rows are searched. Therefore, for such a gradient map, there are 30 times 24 or 720 locations on the gradient map that the template can overlie.

A simple example of the calculation of the normalized correlation for a template having a size of 2×2 is shown in the following example:

Template Values
4  20
6  10

The overlaid portion of the gradient map may for instance be:

Gradient Map Values
3  15
2  20

The value of the Cross term is thus:

Cross=(4×3)+(20×15)+(6×2)+(10×20)

Cross=12+300+12+200=524.

The AutoPatch term is the 2×2 area of the overlaid portion of the gradient map times itself or, AutoPatch=3×3+15×15+2×2+20×20

AutoPatch=9+225+4+400=638.

Similarly AutoTemp is defined as convolving the template with itself, or

AutoTemp=4×4+20×20+6×6+10×10

AutoTemp=16+400+36+100=552

Thus, correlation C(n)=(524×524)/(638×552)

C(n)=274576/352176=0.78

Thus, if a 0.85 confidence factor is required, this portion of the overlaid gradient map would not sufficiently correspond to the template in order for it to be considered a region possibly corresponding to the region about point A of the known object.

If, however, the overlaid portion of the gradient map has the values 4  18
7  12, the value of the Cross term is:

Cross=(4×4)+(20×18)+(6×7)+(10×12)

Cross=16+360+42+120=538

The AutoPatch term is now:

AutoPatch=(4×4)+(18×18)+(7×7)+(12×12)

AutoPatch=16+324+49+144=533.

The AutoTemp value is again 552. It is therefore seen that once the AutoTemp value for the 7×7 template is computed, the visual inspection system need no longer compute its value for that template. This consequently saves in the computation time for the inspection system. C(n) for this second overlaid portion of the gradient map equals:

C(n)=(538×538)/(533×552)

C(n)=289444/294216=0.98

Thus, it is seen that as the overlaid portion of the gradient map corresponds more closely to the template values, the correlation value increases and vice versa.

Figure 6C:
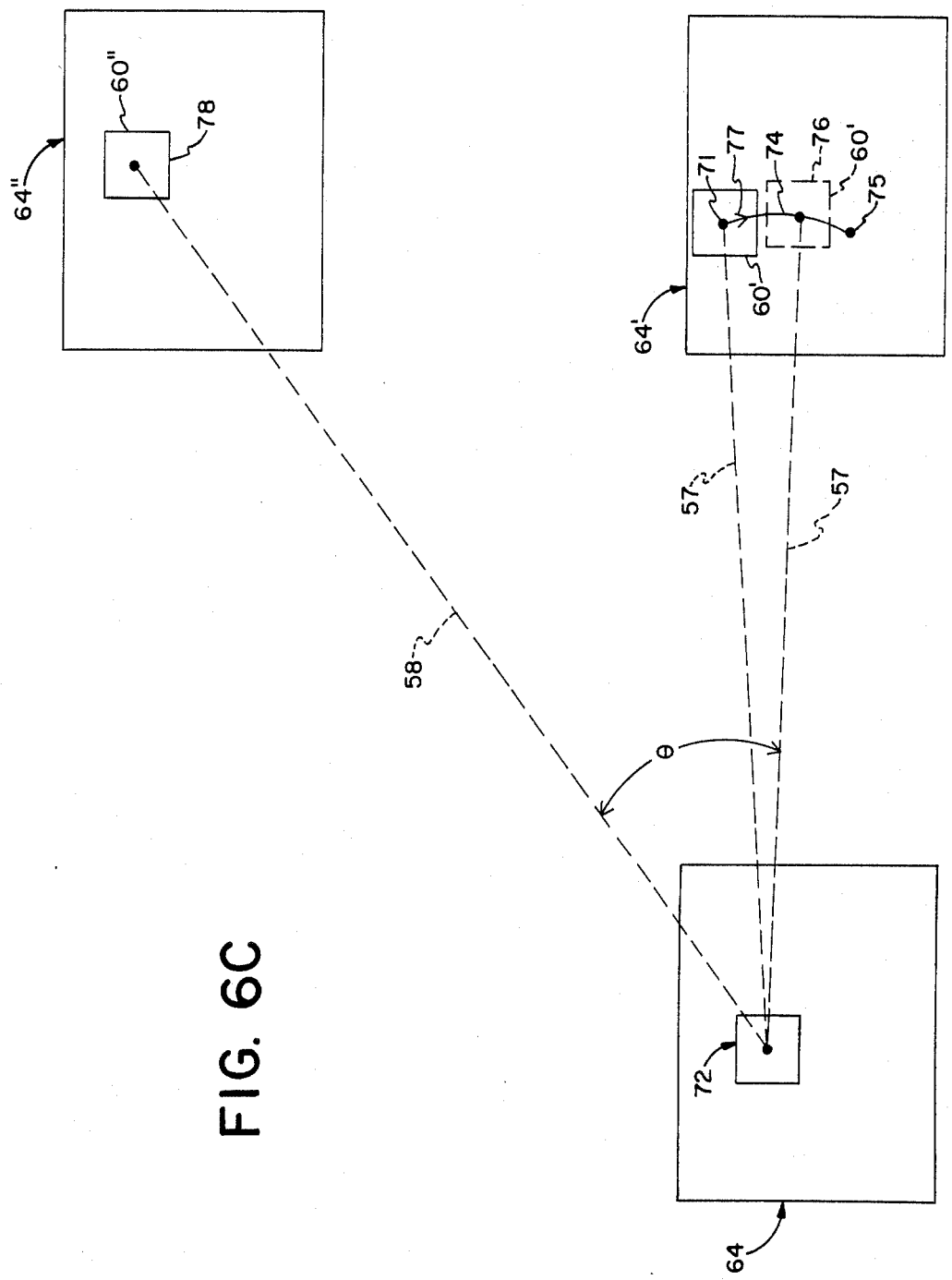
FIG. 6C is a diagrammatic representation of the evaluation of the candidate locations on the unknown object based upon geometric information of the known object selected points.

As shown in FIG. 6C, once a candidate location 72 has been determined on the gradient map, that is, a location with a correlation exceeding 0.85, the system proceeds to determine if a candidate region exists for the second template (template 60' representing the region about point B) having a distance from the center of the first candidate location equal to the length of line segment 57. In essence, the line segment is used as a radius where an arc 74 is transversed along the second gradient map with the center of this arc corresponding to the orientation of second known point B with respect to first known point A as referenced to background 51 (see FIG. 2). Typically, the second template 60' is moved along this arc in a clockwise direction, although other directions could be used if desired (e.g., counterclockwise or starting from the midpoint of the arc and moving first in one direction to the end of the arc, returning to the midpoint and then moving in the other direction). The arc usually subtends plus and minus five degrees about the location where point B is oriented on the known object; although smaller or larger arcs can be selected if desired. The maximum orientation angle that can be tolerated is related to the illumination size or each selected location. For a 9×9 pixel array the maximum rotation of the object under test with respect to the known object must be less than plus/minus the angle whose tangent is 1/9, or approximately ±6°. The tangent value is based upon the observation that if a greater angle is allowed, the value read for the last column can be in a different row than the value in the first column.

If the machinery associated with work area 116 (see FIG. 1 for instance) can accurately position the unknown object, a smaller arc may be sufficient for this portion of the inspection process. The clockwise movement of template 60' is shown diagrammatically in FIG. 6C starting at point 71 and ending at point 75. The template 60' is moved along arc 74 one pixel at a time. For each position of template 60', a correlation value is determined between it and the overlaid portion of gradient map 64' in a manner described above with respect to gradient map 64 and template 60. If this correlation value does not exceed the threshold level (typically 85) then the template is moved one pixel along arc 74 in the clockwise direction (see arrow 77). The correlation for that portion of the overlaid gradient map is then computed and this process is continued along the entire length of arc 74 until a correlation value greater than the threshold is obtained. If such a value is not obtained, the visual inspection system moves template 60 with respect to gradient map 64 in a manner as described above; computes its correlation value, and continues to do so until another candidate region for the first gradient map 64 is found.

Assuming that a candidate region along the arc 74 for gradient map 64 is obtained, such as candidate region 76, then the visual inspection system proceeds to determine if the defined location for gradient map 64" corresponding to the third point of the known object has a correlation value with the unknown object exceeding the threshold value. This is seen in FIG. 6C by the interrelationship between line segment 57 corresponding to candidate region 76 and line segment 58 as defined by angle theta so as to define a potential candidate region 78 for the third gradient map 64". If the correlation value between template 60″ and the overlaid portion of gradient map 64″ as defined by the potential candidate region 78 is greater than the threshold value, then the three candidate regions 72, 76 and 78 are stored by the system and their composite correlation computed and stored. This composite correlation is defined by:

ComCor = C(candidate region 72) × C(candidate region 76) × C(candidate region 78)   (EQ 2-2)

The vision inspection system then proceeds to again increment template 60′ over gradient map 64′ until another correlation value exceeding the threshold is obtained and then re-performs the step of determining if new candidate region 78 exceecs the threshold value. If it does, a new composite correlation value is determined and, if greater than the highest previous value, it replaces that previous value and the new three candidate regions 72, 76, and 78 are stored, replacing the earlier stored values. This process of incrementing template 60′ over gradient map 64′ is continued until the template reaches the clockwise end 75 of as shown in FIG. 6B by line segments 80 and the corresponding values for potential candidate points in gradient map 64′ and 64″ determined.

If a composite correlation value has been obtained, then the highest value as previously discussed represents the three points, A*, B*, and C* on the unknown object which best match the three points defined for the known object. As seen in FIG. 6D, these three points are then used to orient the unknown object with respect to the known object's reference frame R. The change in Cartesian coordinates X and Y, (i.e. delta X and delta Y) and the change in orientation of angle theta (delta $\theta$) with respect to the known object's reference frame represent the translation and rotation respectively of the recognized object's reference frame R* with respect to the known object's reference frame R. The translation in the X and Y coordinates is simply the difference between the coordinates of point A in the known oojcct and the corresponding coordinates of point A* in the recognized object as measured with respect to the known object's reference frame. The rotation of the recognized object's reference frame is then the difference between the angle phi ($\phi$) subtended by line segment 57 of the known object and angle phi* of the recognized object's line segment with respect to the backgound reference frame. This is shown in FIG. 6D.

It is to be noted that the coordinate system R* of the recognized object is related to the known object's reference frame R and therefore once the coordinate transformation is known, all known coordinate values for placement of visual tools on the known object can be directly implemented for corresponding placement of the same visual tools on the recognized object. Therefore within the limits described above, the orientation or the recognized object with respect to the camera's (36) reference frame is immaterial for the vision inspection system. The overall effect is to greatly reduce the mathematical calculations that need to be made in order to use the visual tools of the present invention as explained more fully below.

A complete program listing for the computations discussed above with respect to determining three locations on a known object and determining if corresponding three locations exist on the unknown object is presented in the microfiche appendix under the module entitled "Find." This listing and all the others in the microfiche appendix are written in Pascal source code.

It has been experimentally found that this technique for selecting points on a known object and determining if corresponding points exist on an unknown object through use of gradient information and knowledge of the spatial separation of the three points on the known object allows for extremely reliable recognition testing of unknown objects. The recognition process, by determining not only the recognition of the unknown object, but its orientation with respect to the known object as originally viewed, provides for the re-orientation of visual tools which are then used to make measurements on the unknown object and thereby determine if that object meets predefined conditions. Although three points are used in the preferred embodiment of the present invention, a greater number of points may be used if desired. In theory two points may also be used, although it has been experimentally found to be less reliable in correctly recognizing a test object as compared to the use of three points. Furthermore, in theory one large template could be used if it accurately identified the known object.

The following description is directed to the above mentioned visual tools which are used on the test object after if it has been recognized as corresponding to the known object.

Visual Tools of the Vision Inspection System

Each visual tool provides the means for allowing the user to define a type of measurement to be made at a certain location on an unknown object based upon the use of the corresponding tool on the known object. Thus, when the user first defines the three points on the known object which are to be used in the recognition procedure on unknown objects, he or she can also define the various tools and the placement of those tools and the types of measurements which are to be made by those tools on the unknown object based upon the use of those tools on corresponding places on the known object. The particular test sequences are stored by the visual inspection system shown in FIG. 1 based upon setups of those tests on the recognized known object. A description of these tools is presented below. Program listings for these tools are presented in the attached microfiche Appendix A. The listings are in the Pascal language for use on the Hewlett-Packard (Fort Collins, Colo.) HP computer, and incorporate use of the Hewlett-Packard global variable module.

Caliper

The caliper is a visual tool whose function is analogous to a mechanical caliper; that is, it provides a technique for measuring the inner or outer transverse distances between two surfaces on the object under test. A typical example is shown in FIG. 7 where a machine part 82 includes a disk 83 having a diameter of dimension X, plus or minus some tolerance as identified by line segment 84. In the given example, the diameter is 1.000 in. (2.54 cm.) with a tolerance of ±0.001 in. (±0.00254 cm.). The caliper tool, when the known object is shown on CRT screen 38 (see FIG. 1), is selected by the user and positioned onto the imaged part 82 so as to "clamp" over the periphery of disk portion 83. This is shown diagrammatically in FIG. 7 by the illustrated visual tool 86 corresponding to a mechanical caliper. Such a visual representation of a caliper is actually displayed on the CRT screen, and the particular surfaces or points across which the caliper is to measure via its jaws 87 and 88 is determined by placement of light pen 68 at each end of disk portion 83.

The visual inspection system maintains this information in its memory concerning the orientation of the caliper as well as the specific measurement to be made on the unknown part. Thus once the unknown part is recognized and its orientation determined with respect to the known part, the caliper tool can be locked onto the disk portion of the machine part 82 and a measurement obtained. The actual process of making the measurement is again through use of gradient information in the regions where the caliper "contacts" the disk member 83 so that these two regions correspond to those on the known object when the test procedure was setup by the user. For the measurement of the distance between two hole centers as shown in FIG. 7A, the vision inspection system first employs a hole center visual tool, as described below, followed by measurement of the distance between these hole centers in the direction transverse to caliper jaws 87 and 88.

As seen in FIG. 1, the output of this visual tool information can be sent to I/O module 32 which can in turn control the ultimate disposition of the machine tool under test based upon results of the caliper test.

Thus, for example, as shown diagrammatically in FIG. 1, the output of the I/O module is used to control the loading and unloading of parts 40 onto turntable 120 by controlling solenoid 121 associated with loading chute 122. The I/O module in such a setup controls activation of stepping motor 124 (shown in phantom) used to incrementally rotate turntable 120. Thus each part 40 is first rotated to work location A where its image is viewed by cameras 38. If the unknown object is not recognized, it is rejected into bin 126 through incremental activation of motor 124 followed by activation of piston arm 128. This activation is controlled by I/O module 32. If, however, the part is recognized, measurements via the visual tools are performed with the results of these tests causing the I/O module to instruct the turntable and piston arms 128′ and 128″ to deposit the part in either bin 126′ or 126″ depending upon the results of the tests. Thus, the I/O module output points control the energization and de-energization of the electrically activated equipment associated with the turntable work station.

It should be realized that although the turntable work station shown in FIG. 1 is diagrammatic, it nevertheless represents the operation of an actual work station. Of course, virtually any other test stand or work station configuration can be implemented to suit the needs of the user. The particular work station shown in FIG. 1 is thus only illustrative of one type of installation.

It should be further noted that the I/O module can receive input information on input lines 130 from the interconnected equipment which can be used by the visual inspection system to ascertain the condition of the work station. Thus, for instance, an input could be associated with microswitch 132 which would indicate if a part (such as part 40*) failed to be ejected by one of the piston arms 128. Other types of inputs and input sensors could, of course, be connected to I/O module 32.

A complete program listing of the caliper visual tool is presented in the microfiche appendix under the module name "CALIPER".

Area Counter

Another visual tool implemented by the present invention is an area counter. A complete program listing appears in the microfiche appendix under the module name "AREA." The area visual tool is sometimes referred to as a defect finder, and in operation it defines a rectangle on the known object, such as shown by areas 46, 46′, 46″ in FIG. 2. It then determines the total number of edge pixels within each area for the known object. An edge pixel is defined as a gradient pixel, such as computed with the Sobel matrix as discussed above, where the magnitude of the gradient pixel is greater than some value, such as 32. Basically, this value represents a gradient pixel in which the magnitude of the illumination varies rapidly between adjacent illumination pixels. Thus the user specifies the size of each rectangle on which edge gradient pixels are to be counted and the system for the known object then determines the number of edge gradient pixels within each area and maintains this information in the system's memory.

After an object under test has been identified (that is, it has been recognized as corresponding to the known object) the visual inspection system will, based upon the orientation of the object under test, determine the illumination values in each of the selected areas, compute the gradient pixel information for those areas, and determine if the number of gradient pixels equals that for the corresponding area in the known object. Furthermore, the system then determines the deviation in the number of edge pixels between the object under test and the known object, and if desired (see below), the total intensity of the area. This information is then used to instruct the I/O module 32 to control the disposition of the part under test. Differences in the edge count typically result when the contour of the object under test changes due to a crack or some other defect. It can also occur when a component part is present or missing in a given area.

By use of the number of edges instead of the total intensity of the area, the inspection system attains a high degree of immunity to variations in the ambient lighting. This property is again primarily due to the nature of determining gradient information as distinguished from overall illumination value. However in those applications where average total illumination of a selected area is required, the area counter tool can also be setup to provide this information.

Thus, for example, as shown in FIG. 2A, a user may wish to test for the presence and energization of a pilot light 85 in a given area 81 of an object 79 under test. If the light is energized, the average illumination in the test area is significantly higher than if the light is not energized. The average illumination intensity can therefore be used to perform such tests.

In the example shown in FIG. 2, the tip 45 of pointer 44 should be within the corresponding area 46, 46′, 46″ when the speedometer's cable is turned at the speeds corresponding to 20, 40, and 55 miles per hour, respectively. If the tip is within the area, then the number of edge pixels will substantially correspond to that of the known object as derived during the test set-up. If the pointer is not in the corresponding area, then the edge pixels will be substantially different from the known object; and consequently, this information will be transmitted to the I/O module 32 for use in determining the ultimate disposition of that particular object under test. Of course, the amount of leeway in the comparison of edge count values can be selected by the operator during setup of the test procedure. It is therefore seen that through use of the area counter visual tool, testing for calibration accuracy of an object is easily accomplished.

Segment Reader

The segment reader visual tool provides the vision system with the capability of reading segmented fonts typically comprised of seven line segments. Although there are a number of seven-segment fonts for presenting alphanumeric information, all of these fonts are similar except to the extent that they may differ in size, tilt, aspect ratio (that is, ratio of height to width), and orientation (which direction the character points), but do not vary in basic form. In operation the segment reader is selected by the user on the CRT screen through use of light pen 42 which is then pointed to the character on the known object. The peripheral segment reader jig 105 is then adjusted in height, aspect ratio, tilt, and orientation until it overlies the area of the seven-segment digit.

As seen in FIG. 8, the numeral 8 is displayed by segments 90, 91, 92, 93, 94, 95, and 96. Each segment is sensed for the presence or non-presence of illumination through use of feelers 98 which bisect each line segment. If the segments are brighter than the neighboring background, each feeler is also displayed brighter than the background at each end 99 that overlies the background. Similarly the feeler is darker than the bright line segment for the portion 101 of the feeler that overlies the line segment. The visual annunciation of the feeler is reversed if the line segment is darker than the background.

In this way the presence of non-presence or a line segment under a feeler for an object under test can be ascertained by determining if two gradient values exceed a predetermined value (e.g., 32) representing the edges of the alphnumeric segment along a line positioned by the feelers. By determining which line segments are present, the vision system is able to determine what alphanumeric character is displayed on an object under test.

A complete program listing of the seven-segment reader is presented in the attached appendix under the module name "SEG".

Other visual tools can readily be adapted to the present system for performing other specialized tests, such as reading bar codes, including the Uniform Product Code, measuring angles, finding the center of holes, and measuring other visually perceptible attributes. Output information from such tests can also be transferred through the I/O module 32 to interconnected devices (see FIG. 1) to control the ultimate disposition of parts under test.

Physical Hardware

As best seen in FIG. 1, the vision inspection system 20 comprises a number of modules which combine to perform the functions of the inspection system as described above and as submitted in the attached microfiche appendix. Each module of the vision inspection system comprises components or submodules which are well known in the art. A description of each of these modules as well as the peripheral equipment is presented below.

Cameras 36

Cameras 36 acquire the image or images of the objects under test. Standard commercially available television cameras are typically used such as the Model KP120 320×240 resolution camera manufactured by the Hitachi Corp. of Tokyo, Japan. Such cameras provide 320 horizontal by 240 vertical pixel resolution which for most applications of the visual inspection system is adequate. If greater resolution is required, 1024×1024 pixel resolution cameras such as those manufactured by MTI-DAGE Corp. may be used. As explained above, a plurality of cameras can be used to view different portions of an object where the resolution required to perform the various tests are not satisfied by a single camera. When multiple cameras are used, each image is sequentially stored and used to perform various portions of the vision inspection process. As shown in FIG. 1, analog video signals 43 are first transferred to the frame grabber module 22.

Frame Grabber Module 22

The frame grabber module 22 performs the task of writing into its memory 23 video digital information as received via analog to digital (A/D) converter 25. The A/D converter in turn receives the analog video signals 43 via a multiplexer 29 which can selectively choose any of the camera video signals when multiple cameras are used.

The frame grabber thus stores the digital video high speed information in a 320×240×8 six bit memory arrays if 320×240 pixel resolution cameras are used or in a 1024×1024×8 six bit arrays if high resolution cameras are used. Each pixel may have one of 64 illumination values associated with it and thus 6 bits ($2^6$)are required to store this information. The memory module 23 maintains a 320×240 six bit array for each of the up to eight camera images that may be in use.

This memory is typically dynamic random access memory. The images stored within this memory module represent the entire illumination information for each of the cameras which are used to view the known or unknown part under test.

The output of the memory can be transferred through a scan converter 31 onto a direct port 33 for ultimate presentation on CRT screen 38. Such scan converters are well-known in the art. In the present system the converter controls the transfer of data from memory module 23 to the refresh memory 37 of video output module 28.

Video Output Module 28

The video output module 28 contains a refresh memory 37 which receives data via the high speed private port 33. This memory is typically 320×240×6 bits and thus can store the illumination values associated with one of the cameras. A 1024×1024×6 bit image memory may also be used when high resolution cameras are in use.

This memory also receives color overlay information via lines 35 from the CPU module 26 for visual annunciation of the tools and menu information to the operator. Since this information is normally in a color format, a color map memory 37 is used to generate the desired colors from the overlay data. This memory preferably comprises 4K×12 bits of information for converting the overlay data stored in the image memory into output data which is representative of color information. This color map RAM outputs its information to three 4-bit digital to analog (D/A) converters 65 which convert the digital information into analog information for presention to color monitor 38'.

The video output module 38 also includes a light pen interface 68 for sensing the movement of light pen 42 and converting this information into an output 69 for use by the vision inspection system. Such light pen interfaces are well-known in the art.

Central Processing Unit Module 26

The central processing unit (CPU) module 26 comprises a central processing unit (CPU) 100, from 512K bytes to 2 megabytes of random access memory (RAM) 70, a read only memory (ROM) 104, a direct memory access module (DMA) 106, and a tape interface 108. The CPU is preferably a Motorola type 68000 CPU. The amount of random access memory is determined by the amount of vision instructions needed by the system for any given application. Thus if a plurality of different parts are to be imaged with a plurality of cameras, then a larger memory size is needed than if only a single known part is to be imaged. The memory size can also vary depending upon the types of visual tools used and the particular tests implemented that use those tools. In any event, the minimum memory size in the preferred embodiment of the present invention is 512K bytes for program and data storage.

The overall CPU module acts as a high speed general purpose computer where all programming, input/output handling, and program execution for inspection are performed.

The tape interface module 108 is used to transfer data from the tape drive 102 of programmer module 34 to the CPU module 26. The tape drive 102 typically includes program information for a particular test set-up which can be input to the CPU module via the tape interface. Such interface modules are well-known in the art.

Array Processor Module 24

The array processor module 24 provides the special purpose hardware required to perform the various array operations discussed above for performing Sobel edge detection and correlation at a high speed. Due to the great number of calculations which need to be performed in both the Sobel edge detection process and the correlation processes, a general purpose CPU module would not be able to provide real time output with the current state of the art of such microprocessor based central processing units. The array processor module overcomes this problem by being a dedicated hardware device for performing certain types of mathematical functions.

The array processor module includes a 48K byte high-speed memory 110 which is used to store various computation results performed by the array processor of both an intermediate and final nature, a sequencer-/address generator module 112 for accessing and transferring data from the high speed memory module 110, and a pipeline arithmetic module 140 for performing high speed mathematical manipulations.

Figure 9A:
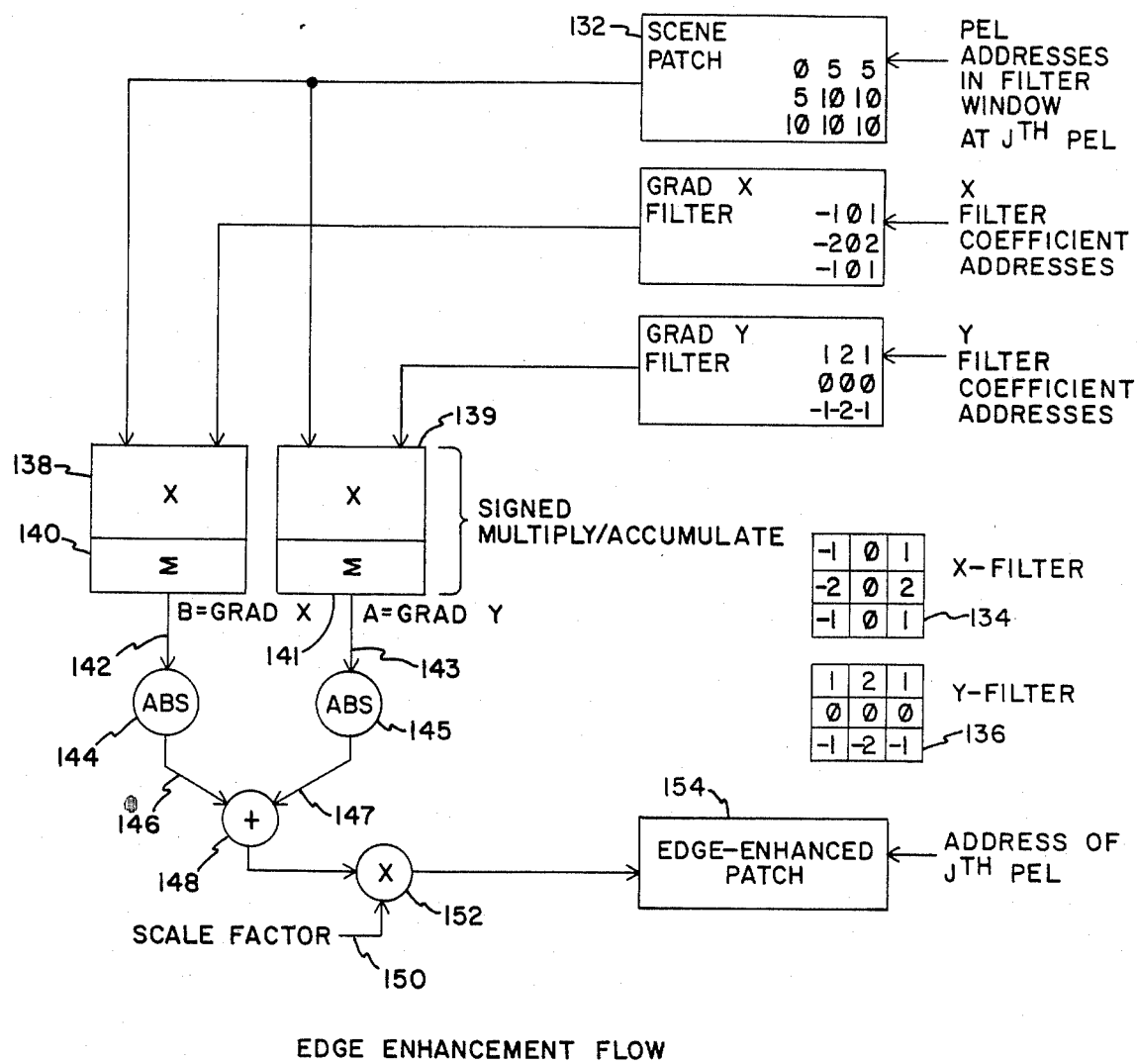
FIG. 9A is a detailed block diagram of the operations performed by the array processor shown in FIG. 1 so as to compute gradient information.

As best seen in FIGS. 1, 9A, and 9B the array processor performs the majority of the mathematical calculations needed to determine the Sobel gradient values and the correlation values. FIG. 9A shows a detailed block diagram of the portion of the array processor which produces Sobel type gradient information based upon illumination data. The illumination data is received from the frame grabber module (see FIG. 1) for each pixel or pel address about the selected pel address. The gradient value for a selected address is thus based upon the eight neighboring illumination values, forming a "window" of values. FIG. 3 shows a 9×9 sample array of illumination values. The fifth row, fifth column entry denoted by the letter "J" is seen to be the number 10 which corresponds to the illumination value at this particular pixel or pel location. The surrounding numbers are thus:

```
 0   5   5
 5  10  10   (scene patch 132)
10  10  10
```

This is also shown in the scene patch window block 132 in FIG. 6A. As noted above (see equation 1-3), the gradient in the X direction is defined by the equation $$\text{Grad}_x = (c + 2f + i) - (a + 2d + g).$$

This is shown in FIG. 9A by the $\text{Grad}_x$ filter array 134. Similarly, the gradient in the y direction is defined by the equation $$\text{Grad}_y = (a + 2b + c) - (g + 2h + i).$$

This is shown in FIG. 9A by the $\text{Grad}_y$ filter array 136.

As also shown in FIG. 9A, the x and y filters are respectively multiplied bit by bit with the values from the scene patch 132 as denoted by the assigned multiply modules 138 and 139. These individual multiplication values are then summed by modules 140 and 141 whose outputs 142 and 143 respectively represent the gradient x and gradient y values for that particular scene patch. As denoted by the earlier equation, the gradient at any particular location is defined by the absolute values of gradient x and gradient y, and thus outputs 142 and 143 have their values changed to absolute values by nodes 144 and 145 respectively with their outputs 146 and 157 summed at node 148 whose output 149 is in turn multiplied by a scaling factor 150. This scaling factor is used to adjust the gradient values so as to be within some predetermined maximum range. The output of node 152 performing this multiplication is transferred to an edge enhanced patch 154 which thus represents the gradient value for the particular illumination values about the selected location. In the example shown, gradient x and gradient y are −15 and −25 respectively, and therefore the sum of their absolute values is 40. This is seen for the location in FIG. 4 corresponding to the fourth row and fourth column. This Sobel processing of illumination information is performed both on the known object to produce templates 60, 60′ and 60″ for the selected locations as well as on the unknown objects so as to generate the corresponding gradient maps 64, 64′ and 64″.

The array processor as shown in FIG. 9B also performs the correlation process between the overlaid portion of the gradient map 64, 64′ or 64″ as denoted by patch 160 and the template 60, 60′ or 60″. The patch 160 therefore corresponds to a 7×7 array from the corresponding gradient map 64, 64′ or 64″. The template similarly comprises an array of 7×7 elements, and the output from patch 160 is transferred to multiplying module 162 with associated summing module 163 so as to compute the Autopatch term for the correlation value C(n) (see equation 2-1 above). The Cross term between the patch and the template is performed by multiplying module 164 and summing module 165, generating output 167. The output 166 from Autopatch summing module 163 is transferred to a division node 168 where its value is divided by the output value 167 of the Cross term so as to yield Cross/Autopatch (A/B as shown in FIG. 9B). Similarly, the value of Cross divided by the Autotemp is obtained by division node 169 where C has been previously calculated. As noted earlier, the autotemplate (Autotemp) value is a constant for the entire correlation process for each template and thus once computed, it need no longer be re-evaluated. In FIG. 9B, this is shown by the numeral C which is equal to convolving the template with itself.

Outputs 170 and 171 from the division nodes 168 and 169 are in turn multiplied at node 172 so as to yield the correlation value; that is, Cross×Cross/(Autopatch×Autotemp). The output 174 is transferred to a score module 176. This autocorrelation score represents the degree of fit between the template and the overlaid portion of the gradient map.

These correlation scores thus represent the degree of correspondence between the template and the overlaid portion of the gradient map as shown in FIG. 9C, which depicts a compilation of these correlation values for a typical template as it is moved across a gradient map. For the values shown in FIG. 9C, they represent the movement of template 60 shown in FIG. 9D over gradient map 64 shown in FIG. 9E. The template 60 represents the gradient values for an image of a hypothetical moose while the gradient map represents the gradient values for an image of a moose in the woods. As shown in FIGS. 9C and 9E, as the template overlies the portion of the gradient map in the vicinity of the moose, the correlation values increase with the maximum value (1.0) occurring when the template overlies the moose. In a vision inspection process, the moose is actually a portion of a known object having some characteristic feature selected by the user, while the gradient map is a portion of an unknown object which should contain a region corresponding to the selected area on the known object.

The array processor 24 thus performs these high speed mathematical calculations to compute each template and each gradient map and the correlation between the respective templates and gradient maps so as to quickly determine if an unknown object corresponds to a known object. Thus although these calculations can be performed by a general purpose digital computer, it is not feasible to do so if real time inspection operations are to be performed.

Therefore, although the array processor shown in FIG. 1 and 9A and 9B has been specially designed to perform the particular gradient and correlation calculations, the specific implementation of such an array processor would of course be straightforward from the previously described techniques.

Bus 30

Bus 30 provides the data path for interconnecting the frame grabber module 22, the array processor 24, the CPU module 26, and the video output module 28.

This bus incorporates the VME ™ bus manufactured by the Motorola Semiconductor Products Corporation of Phoenix, Ariz. in association with the Mostek Corporation of Carrolton, Tex. and the Signetics Corporation of Sunnyvale, Calif. It is described in a Motorola Corporation document entitled *VME ™ Bus Specification Manual*, No. M68KVMEB/D1, Revision A, October, 1981.

Input/Output Module 32

The input/output (I/O) module 32 provides the interconnection of the inspection system to the outside world. Typically this module comprises a Series 500 input/output module as manufactured by the Programmable Control Division of Gould Inc., Andover, Mass. The output portion of this input/output module provides the necessary isolation and power amplification needed to drive external motors, solenoids and other devices used to control loading and unloading of parts to be tested in work area 116. Input information is also received from the work area to confirm proper positioning of the various mechanisms associated with the work area. This information in turn is transferred to the vision inspection system through an input/output interface module 55 (see FIG. 1).

Programmer Module 34

The programmer module 34 includes a CRT module 38, a light pen 42, and a tape drive 102. The CRT can be any standard black and white type cathode ray tube for imaging parts under test. A color monitor may also be used. In the preferred embodiment of the present invention a type CU 901DA monitor manufactured by Nippon Electric Corp. (NEC) of Tokyo, Japan is used. The tape drive is also of conventional design. The preferred embodiment of the vision system uses a Model 3214 tape drive manufactured by the Tandberg of America, Inc. of Armonk, N.Y.

Similarly the light pen 42 is of conventional design such. The preferred embodiment of the present invention uses a light pen manufactured by Welch-Allyn Inc. of Skaneateles Falls, N.Y. The light pen provides input information to the visual inspection system when the stylist 49 is brought into contact with the screen of CRT 38. The light pen is the device through which all user information is input to the system. A keyboard is not used by the vision system in order to maintain high reliability on the factory floor where the vision system is typically used. A light pen with visual prompts, especially color prompts, has been found to be an efficient vehicle for user input.

It is therefore readily apparent that one of ordinary skill in the electronics art can, by the interconnection of the disclosed modules, form the necessary hardware for implementing the present invention.

Thus what has been described is a versatile visual inspection system that provides the user with the ability to identify points associated with a known object which are then used as positioning pins for determining if an unknown object corresponds to the known object. This process uses illumination information which is converted into gradient information for pixel areas about each of the selected points. The spatial relationship of these points is also used to determine if an object under test is recognized as corresponding to the original known object.

A plurality of visual tests or tools can be used on the known object so as to instruct their use on a recognized object and thereby determine if the object under test meets predefined criteria as desired by the user. The results of such tests, including the recognition test, is transferred through an input/output module to control the ultimate dispositon of each tested object.

A plurality of such tests for a plurality of known objects can be maintained in the system and transferred to the central processing unit from a tape drive. A versatile visual test system is thus described.

Having described the invention, what is claimed is:

1. A vision inspection system for inspecting unknown objects in relationship to a known object and for performing various visual tests on the unknown object if it is recognized as corresponding to the known object, comprising:
   A. vision sensing means for producing data representing the illumination values for viewed objects;
   B. means for receiving data from the vision sensing means and for storing the image of objects under test;
   C. means interconnected to the image storing means for viewing an imaged object;
   D. means interfaced with the viewing means for selecting at least three regions of the known imaged object;
   E. means interfaced with the image storing means for selecting regions on an unknown object, each region corresponding to one of the selected regions of the known object, each selected region on the unknown object having a size at least equal to the size of the corresponding region on the known object;
   F. means interfaced with the image storing means for determining and storing gradient values based upon the rate of change of illumination values for each selected region of the known and unknown objects, said gradient values for each selected region of the known object called a template and for each selected region of the unknown object called a gradient map;
   G. means interfaced with the gradient value determining means for determining the spatial and angular relationships between the templates;
   H. means interfaced with the gradient value determining means and spatial and angular relationship determining means for overlaying the templates with the gradient maps and for determining the correlation value between each template and the corresponding gradient map, with the separation of said templates based upon the previously determined spatial and angular relationships of said templates;
   I. means interfaced to the correlation value determining means for determining if each correlation value is greater than a predetermined value and if true, determining a composite correlation value of said correlation values;
   J. means interfaced with the gradient value determining and storing means for moving the templates over each corresponding gradient map so that the correlation value means and composite correlation value means determine their respective correlation and composite correlation values throughout the entire area of each gradient map;
   K. means interfaced with the composite correlation value determining means for determining the maximum composite correlation value, if any, and for determining the portions of each gradient map corresponding to this highest composite correlation value; and
   L. input/output (I/O) means interfaced with the maximum correlation value determining means for controlling the disposition of the test object based upon the presence or absence of a maximum composite correlation value;

whereby the portions of each gradient map yielding the highest composite correlation value represent recognition of the object under test as corresponding to the known object.

2. A vision inspection system as defined in claim 1, wherein the means for determining gradient values uses a Sobel technique wherein for an array of illumination values denoted by $$\begin{array}{ccc} a & b & c \\ d & e & f \\ g & h & i \end{array}$$

the gradient is equal to $$\text{Grad} = |\text{Grad}_x| + |\text{Grad}_y|;$$

where $$\text{Grad}_x = (c + 2f + i) - (a + 2d + f)$$

and where $$\text{Grad}_y = (a + 2b + c) - (g + 2h + i).$$

3. A vision inspection system as defined in claim 2, wherein the correlation value determined by the correlation means is defined by the equation:

Correlation = (Cross × Cross)/(AutoPatch × AutoTemp);

where Cross equals a number obtained by summing the results of multiplying each element in the template with the overlaid element in the gradient map and summing the products, where AutoPatch equals a number obtained by summing the results of multiplying each element in the overlaid portion of the gradient map times itself, and where AutoTemp equals a number obtained by summing the results of multiplying each element in the template with itself.

4. A vision inspection system as defined in claim 3, wherein the means for determining a composite correlation value derives a number obtained by multiplying the correlation value of the first template-gradient map pair by the other correlation values for the remaining template-gradient map pairs.

5. A vision inspection system as defined in claim 4, wherein the means for moving the templates over each corresponding gradient map executes the following steps:
   1. determining the correlation value (first correlation value) between the first template and the first gradient map, starting at a first location on the gradient map and moving the template across the first gradient map until a correlation value is determined which is greater than said predetermined value,
   2. determining the correlation value (second correlation value) between the second template and the second gradient map having a distance from the location of the first template at its then current position equal to the spatial distance between the first and second templates as determined on the known object, and moving this second template over the second gradient map as defined by an arc equal to this spatial distance, the arc having a predetermined angular size, until a correlation value is obtained greater than said predetermined value, 3. determining a correlation value (third correlation value) between the third template and the third gradient map spaced and angularly positioned from the first and second templates in their then current positions as said template is spaced and angularly positioned on the known object, and if the correlation value is greater than the predetermined value, then determining the composite correlation value by said composite correlation value means, 4. continuing the movement of the second template with respect to the second gradient map throughout the entire arc length and if any correlation value is greater than the predetermined value, determining the corresponding third correlation value between the third template and the third gradient map as angularly and spatially determined by the current positions of the first and second templates, and 5. after completion of step 4, returning to step 1 and continuing steps 1–5 until the first template has been positioned over each portion of the first gradient map.

6. A vision inspection system as defined in claim 1, further comprising means for performing visual tests (representing visual tools) to a recognized test object based upon the placement and use of those visual tests on the known object.

7. A vision inspection system as defined in claim 6, wherein the input/output means further comprises means for further controlling the disposition of the test object based upon the results of the test procedures performed on the test object.

8. A vision inspection system as defined in claim 7, wherein one of the visual tests is a caliper test comprising means to allow the user to place a caliper image across two positions of an imaged known object and further comprises means for measuring the distance between corresponding positions as defined by their locations on the known object and wherein the results of this test procedure are further used as information for the input/output means for controlling the disposition of the recognized object.

9. A vision inspection system as defined in claim 7, further comprising visual tool means for determining the number of gradient values having magnitudes greater than a predetermined value within an area selected by the user with respect to the known object, wherein a corresponding area is tested on the recognized test object and wherein the number of gradient values having magnitudes greater than said predetermined value are compared to the corresponding number of gradient values for the known object and wherein the results of this test procedure are further used as information for the input/output means for controlling the disposition of the recognized object.

10. A vision inspection system as defined in claim 7, further comprising visual tool means for reading a multi-segment line display wherein said means allows the user to visually position a perimeter series of line segments (called a "jig") about the location of a multi-segment line display on an imaged known object and further wherein perpendicularly placed lines ("feelers") bisect each imaged line segment which is to be tested for presence or non-presence and wherein said visual tool means further comprises means for determining the presence or non-presence of line segments as positioned by said "feelers" on the recognized test object whose overall position on the test object corresponds to the placement of the multi-segment display on the known object and further wherein the results of this test procedure provide information to the input/output means for controlling the disposition of the recognized test object.

11. A vision inspection system as defined in claim 1, wherein the vision sensing means comprises at least one camera which images objects via frontal illumination.

12. A vision inspection system as defined in claim 11, wherein the means for viewing an imaged object comprises a monitor and wherein the means for selecting at least three regions on the known imaged object comprises a light pen, manipulatable by the user on the monitor.

13. A vision inspection system as defined in claim 12, wherein the gradient value determining means comprises an array processor for determining gradient values for the selected regions on the known and unknown objects and for determining the correlation values between overlaid portions of the templates with corresponding portions of the gradient maps.

* * * * *